(12) United States Patent
Matsumoto

(10) Patent No.: US 6,377,753 B1
(45) Date of Patent: Apr. 23, 2002

(54) MULTIPLE-POINT AUTOMATIC FOCUSING CAMERA

(75) Inventor: Hisayuki Matsumoto, Hino (JP)

(73) Assignee: Olympus Optical Co., Ltd. (JP)

(*) Notice: Subject to any disclaimer, the term of this patent is extended or adjusted under 35 U.S.C. 154(b) by 74 days.

(21) Appl. No.: 09/613,946

(22) Filed: Jul. 11, 2000

(30) Foreign Application Priority Data

Jul. 14, 1999 (JP) .......................................... 11-200730

(51) Int. Cl.$^7$ .......................... G03B 13/36; G03B 15/05
(52) U.S. Cl. .......................... 396/96; 396/109; 396/121; 396/157
(58) Field of Search .......................... 396/106, 96, 121, 396/122, 123, 157, 109, 104

(56) References Cited

U.S. PATENT DOCUMENTS

| | | | |
|---|---|---|---|
| 4,843,515 A | 6/1989 | Matsui et al. | 354/403 |
| 4,963,911 A | 10/1990 | Matsui et al. | 354/403 |
| 5,175,579 A | 12/1992 | Matsui et al. | 354/403 |
| 5,293,194 A | 3/1994 | Akashi | 354/402 |
| RE34,900 E * | 4/1995 | Mogamiya et al. | 396/106 X |
| 5,448,330 A * | 9/1995 | Takagi | 396/106 |
| 5,526,088 A * | 6/1996 | Kusaka | 396/96 |
| 5,870,637 A * | 2/1999 | Sensui | 396/109 |
| 6,084,658 A * | 7/2000 | Kawabata | 396/106 X |
| 6,222,996 B1 * | 4/2001 | Nonaka | 396/104 |
| 2001/0038750 A1 * | 11/2001 | Kindaichi | 396/96 |

FOREIGN PATENT DOCUMENTS

| | | | |
|---|---|---|---|
| JP | 63-78133 | 4/1988 | G03B/3/00 |
| JP | 63-78134 | 4/1988 | G03B/3/00 |
| JP | 63-82407 | 4/1988 | G03B/3/00 |
| JP | 3-220535 | 9/1991 | G03B/13/36 |
| JP | 11-52225 | 2/1999 | G02B/7/32 |

* cited by examiner

Primary Examiner—W. B. Perkey
(74) Attorney, Agent, or Firm—Ostrolenk, Faber, Gerb & Soffen, LLP

(57) ABSTRACT

In a multiple-point automatic focusing camera of this invention, when a focal point is detected to a focal point detecting region in the center of a shot screen by an AP sensor and a main control circuit, a LED having a narrow light distribution angle is used as a supplemental light source. On the other hand, upon detecting the focal point in a focal point detecting region in the periphery of the shot screen, a stroboscope light source having a wide light distribution angle is used as the supplemental light source. As a result, the focal point can be detected in any focal point detecting region even at the time of a low luminance. At this time, the stroboscope light source may be originally equipped for illumination at the time of photographing. Further, the LED may be of small size having a narrow light distribution angle. Thus, the size of the supplemental light source can be suppressed.

31 Claims, 21 Drawing Sheets

MULTIPLE-POINT AUTOMATIC FOCUSING CAMERA

This application claims benefit of Japanese Application No. Hei 11-200730 filed in Japan on Jul. 14, 1999, the contents of which are incorporated by this reference.

BACKGROUND OF THE INVENTION

1. Field of the Invention

The present invention relates to a multiple-point automatic focusing camera which detects a focal point in plurality of focal point detecting regions.

2. Description of the Related Art

Since before, a multiple-point automatic focusing camera which detects a focal point in plurality of focal point detecting regions has been well known. In such a multiple-point automatic focusing camera, generally, the focal point is detected with three points which include the center of a screen and two points, right and left to the center. Alternatively, the focal point is detected with five points including the above three points plus two points, above and below the center. Recently, cameras which detect the focal point with more distance measuring points or in more focal point detecting regions have been marketed, so that the number of the distance measuring points is inclined to increase.

Further, there is a prospect that the distance measuring points will be disposed substantially in an entire range of an shot area in future. With such an increase of the distance measuring points in a surrounding region of the image screen, an irradiation range of a supplemental light is inclined to be expanded. The supplemental light mentioned in this specification means a light which is to be irradiated to an object to increase light intensity of an object image if the light intensity of the object image is not enough when the focal point is detected.

As a light source of the supplemental light or a supplemental light source, for example, a light emission device such as light emission diode(LED) is used and designed specially to coincide with automatic focusing function of a camera. This light emission device is classified into a type incorporated in the camera and a type installed on an external attachment stroboscope. The external attachment stroboscope is used widely for multiple kinds of cameras from a widely marketed camera to a high grade professional camera. Therefore, the supplemental light source provided on the external attachment stroboscope is not always designed specially to correspond to the automatic focusing function of a camera to which the external attachment stroboscope is to be attached. Therefore, depending on the distance measurable range of the camera, a supplemental light is not distributed to distance measuring points in the periphery of the shot screen within an irradiation range of the supplemental light of the external attachment stroboscope, so that when luminance of an object is short, the focal point cannot be detected at the distance measuring point in the periphery of the shot screen.

Thus, use of the external attachment stroboscope corresponding to the distance measuring range of the camera is demanded. However, because the distance measuring range of the camera is inclined to expand as described above, if an external attachment stroboscope equipped with a supplemental light source corresponding to the distance measuring range is required each time when a new camera having such an expanded distance measuring range is introduced, economic burden of user increases. Further, development of such a supplemental light source needs countermeasure against increases of production cost and unit size accompanied by an increase of the irradiation range. Securing an irradiation range corresponding to the distance measuring range of a camera is an important problem for the supplemental light source.

Under the above described background, following conventional technologies are already known about the supplemental light source for use in the multiple-point automatic focusing camera.

Japanese Patent Application Laid-Open No.SHO63-78133 has proposed a technology for coping with changes in position of the focal point detecting region by providing a supplemental light source having an irradiation range expanded up to the periphery around the focal point detecting region in the center of the screen.

Japanese Patent Application Laid-Open No.SHO63-78134 has proposed a technology for saving electric power by stopping the supplemental light when it is determined that the supplemental light does not reach the focal point detecting region in the periphery of the screen so as to stop waste irradiation of the supplemental light.

Japanese Patent Application Laid-Open No.SHO63-82407 has proposed a technology for saving electric power by providing with a supplemental light source capable of projecting the supplemental light to all the focal point detecting regions and then projecting the supplemental light to only a selected focal point detecting region.

Japanese Patent Application Laid-Open No.HEI3-220535 has proposed a technology for saving electric power by selecting a focal point detecting region which excludes irradiation of the supplemental light in order to avoid the irradiation of the supplemental light to a focal point detecting region in the periphery of the screen in which detection of the focal point is difficult.

Japanese Patent Application Laid-Open NO.HEI11-52225 has proposed a technology that two supplemental light sources are provided on both sides of a photographing lens and by selecting any supplemental light depending on the focal point detecting region, a supplemental light suitable for a camera posture and a position of the focal point detecting region is projected.

However, the Japanese Patent Application Laid-Open No.SHO63-78133 has such a problem that if the irradiation range of the supplemental light source is expanded, the sizes of the supplemental light source increase so that production cost also increases.

Further, the Japanese Patent Application Laid-Open No.SHO63-78134 has such a problem that a focal point detecting region not irradiated with the supplemental light is generated so that a focal point detecting region in which accurate focal point detection is difficult due to a shortage of luminance is generated.

Further, the Japanese Patent Application Laid-Open No.SHO63-82407 has such a problem that by providing with a supplemental light source for irradiating all focal point detecting regions, the size of the supplemental light source is increased thereby inducing an increase of production cost.

Further, the Japanese Patent Application Laid-Open No.HEI3-220535 has such a problem that a focal point detecting region not irradiated with the supplemental light is generated so that a focal point detecting region in which accurate focal point detection is difficult due to shortage of luminance is generated.

Further, the Japanese Patent Application Laid-Open No.HEI11-52225 has such a problem that by providing with two supplemental light sources, a supplemental light source loading space increases and production cost also increases.

OBJECTS AND SUMMARY OF THE INVENTION

Accordingly, a first object of the present invention is to provide a multiple-point automatic focusing camera capable of detecting the focal point in any focal point detecting region even at the time of a low luminance while suppressing the size of the supplemental light source.

Then, a second object of the present invention is to provide a multiple-point automatic focusing camera having an advantage of a stroboscope light source capable of securing a wide light distribution angle and an advantage of the LED capable of reducing dazzling and securing a high focal point detecting accuracy with a low power consumption by using the stroboscope light source and LED depending on the focal point detecting region.

To achieve the above object, the present invention provides a multiple-point automatic focusing camera for detecting the focal points in plurality of focal point detecting regions, comprising: a light emission means for emitting a flash light to an object; and a supplemental light control means for controlling the light emission means as a supplemental light source. Then, if it is determined that the supplemental light is necessary for detecting the focal point, and the focal point is detected at least in a focal point detecting region located in the periphery of a shot screen, of the plurality of focal point detecting regions, the supplemental light control means is activated.

This objects and advantages of the present invention will become further apparent from the following detailed explanation.

DETAILED DESCRIPTION OF THE PREFERRED EMBODIMENTS

Hereinafter, the preferred embodiments of the present invention will be described in detail with reference to the accompanying drawings.

FIGS. 1 to 14 concern the first embodiment of the present invention. Prior to a description of a structure of the multiple-point automatic focusing camera of this embodiment having features in its focusing control means, a theoretical structure of the focusing control means of the multiple-point automatic focusing camera of this embodiment will be described with reference to FIG. 1.

Figure 1:
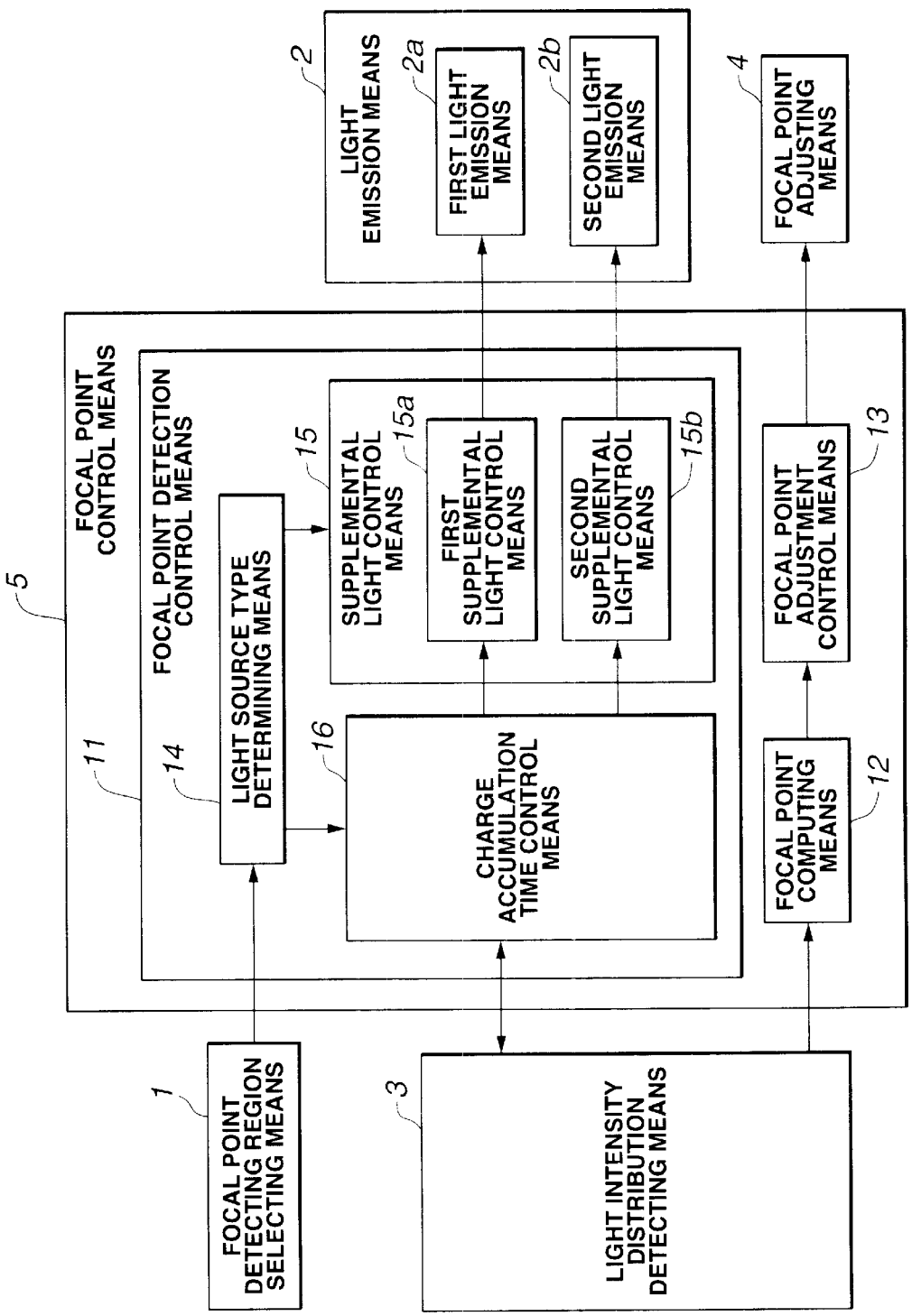
FIG. 1 is a block diagram showing a substantial structure of a multiple-point automatic focusing camera of a first embodiment of the present invention.

As shown in FIG. 1, the multiple-point automatic focusing camera of this embodiment comprises theoretically, a focal point detecting region selecting means 1 for selecting one or plurality of focal point detecting regions from plural focal point detecting regions; a light emission means 2 for emitting a supplemental light to be irradiated to a focal point detecting region selected by the focal point detecting region selecting means 1; a light intensity distribution detecting means 3 for obtaining a signal for indicating the light intensity of each picture element in the focal point detection region selected by the focal point detecting region selecting means 1; a focal point adjusting means 4 for adjusting the focal point of a photographing lens; and a focal point control means 5 for controlling drives of the light emission means 2 and light intensity distribution detecting means 3 depending on the focal point detecting region selected by the focal point detecting region selecting means 1, obtaining a focal point from a light intensity signal obtained by the light intensity distribution detecting means 3 and controlling a drive of the focal point adjusting means 4 depending on the obtained focal point.

The focal point detecting region selecting means 1 is a means for selecting which region of, for example, plurality of focal point detecting regions will be used or whether plurality of focal point detecting regions will be used.

The light emission means 2 acts as an illuminating means for emitting illumination light upon photographing, and comprises a first light emission means 2a composed of a stroboscope which emits flash light and a second light emission means 2b which does not act as the illuminating means upon photographing but composed of, for example, light emission diode (LED) or lamp. Light from the first light emission means 2a is projected to all focal point detecting regions, while light from the second light emission means 2b is projected to the focal point detecting region substantially in the center of an image to be photographed.

The light intensity distribution detecting means 3 outputs an electric signal corresponding to light intensity of each picture element contained in the focal point detecting region. Charge accumulation time is controlled by the focal point control means 5 so that obtained light intensity signals are integrated.

The focal point control means 5 comprises a focal point detection control means 11 for controlling drives of the light emission means 2 and the light intensity distribution detecting means 3 depending on a focal point detecting region selected by the focal point detecting region selecting means 1, a focal point computing means 12 for obtaining a focal point from light intensity signal obtained by the light intensity distribution detecting means 3 and a focal point adjustment control means 13 for controlling a drive of the focal point adjusting means 4 based on a focal point obtained by the focal point computing means 12.

The focal point detection control means 11 comprises a light source type determining means 14 for determining which light emission means 2a, 2b will be selected or whether any one of the light emission means 2a, 2b will not be selected depending on a focal point detecting region selected by the focal point detecting region selecting means 1, a supplemental light control means 15 for controlling the light emission means 2 to emit a supplemental light based on a determination result of the light source type determining means 14, and a charge accumulation time control means 16 for controlling charge accumulation time of the light intensity distribution detecting means 3 based on a determination result of the light source type determining means 14. The supplemental light control means 15 comprises a first supplemental light control means 15a for controlling the first light emission means 2a to emit a supplemental light and a second supplemental light control means 15b for controlling the second light emission means 2b to emit a supplemental light.

According to this embodiment, if the supplemental light is required and focal point detection is carried out substantially in the center of a shot area, the second supplemental light control means 15b is actuated and if the supplemental light is required and focal point detection is carried out at least in a region other than the center of the shot area, the first supplemental light control means 15a is actuated. Consequently, if the focal point detection is carried out in the focal point detecting region substantially in the center of the shot area, the supplemental light is projected to the focal point detecting region by the second light emission means 2b in the center of the shot area. If the focal point detection is carried out at least in a region other than the substantially central region of the shot area, the supplemental light is projected to the entire focal point detecting region by the first light emission means 2a comprising a stroboscope.

Figure 2:
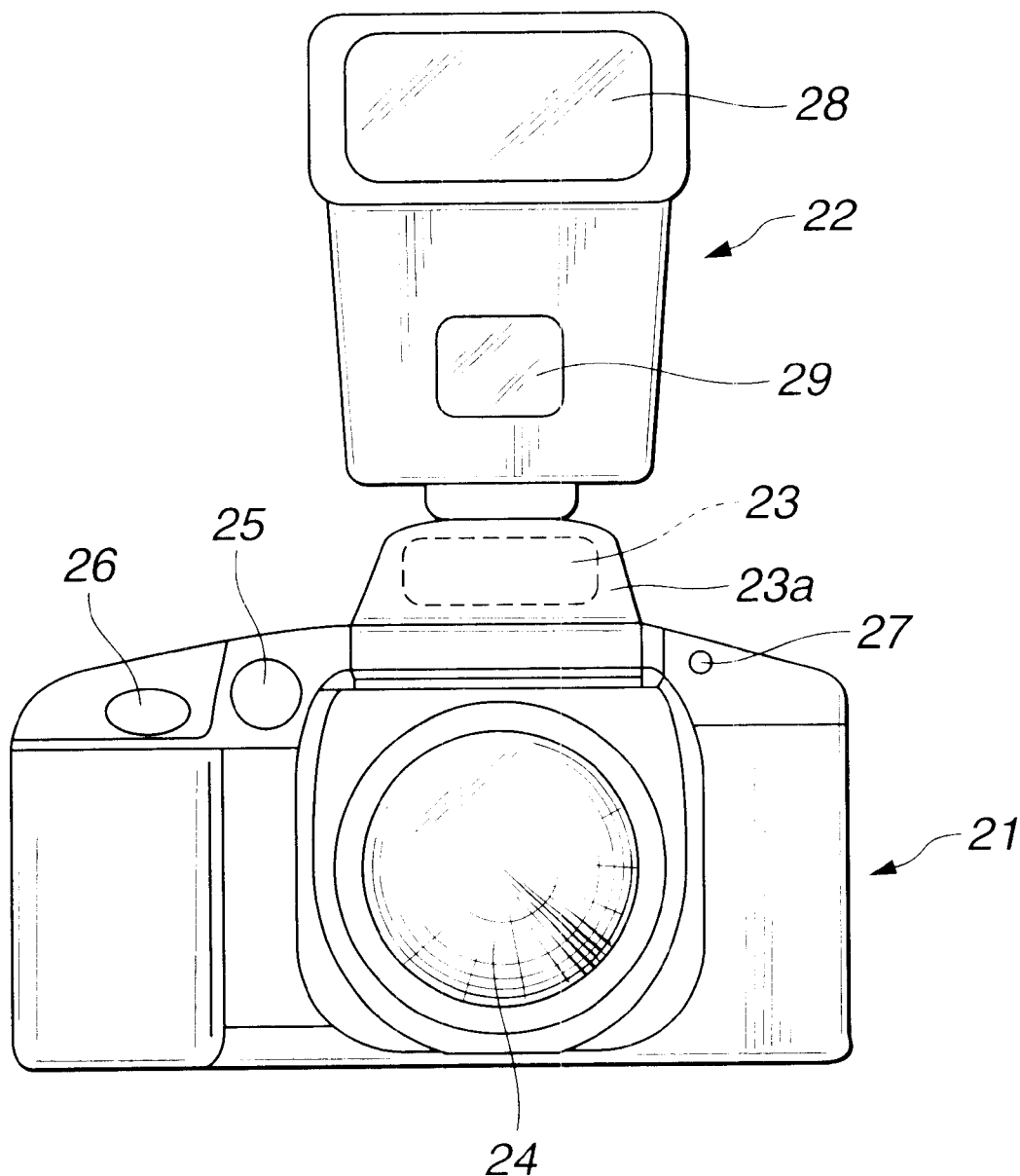
FIG. 2 is a front view showing a structure of an external appearance of the multiple-point automatic focusing camera of the first embodiment.

Next, a structure of this embodiment will be described in detail. As shown in FIG. 2, the multiple-point automatic focusing camera of this embodiment includes a camera main body 21 which is, for example, single-lens reflex camera and an external attachment stroboscope 22 which is detachably attached to the camera main body 21 as required.

The camera main body 21 is composed of a stroboscope light source 23 which emits flash light as illumination light for photographing and further emits a supplemental light for detecting the focal point, a picture-taking lens 24 which receives an impingement of an object image and has a function for adjusting at least of the focal point, a LED 25 for emitting a supplemental light for detecting the focal point, a release switch 26 for inputting an instruction for focal point detection and photographing, and a focal point detecting region selecting switch 27 for selecting and instructing a focal point detecting region.

The stroboscope light source 23 is used when the aforementioned external attachment stroboscope 22 is not attached so that the light intensity of an object is below a predetermined level. This stroboscope light source 23 is accommodated behind a lid 23a when it is not intended to emit flash light and when it is intended to emit the flash light, it automatically or manually hops up so as to be exposed to the object.

The focal point detecting region selecting switch 27 is capable of selecting any one of plurality of focal point detecting regions and further capable of selecting well known multiple point automatic focusing function of allowing the camera to automatically select plurality of focal point detecting regions.

The external attachment stroboscope 22 comprises a stroboscope light source 28 which emits flash light as illumination light for photographing and supplemental light for detecting the focal point and LED 29 which emits the supplemental light for detecting the focal point.

The aforementioned LEDs 25, 29 have a well known structure each which projects a supplemental light having a predetermined light emission pattern to an object. As a result, the focal point can be determined based on light intensity distribution of the object to which that light emission pattern is projected. Meanwhile, the LEDs 25, 29 may be replaced with a lamp and if the lamp is used, the light intensity on the object for detecting the focal point can be increased.

Figure 3:
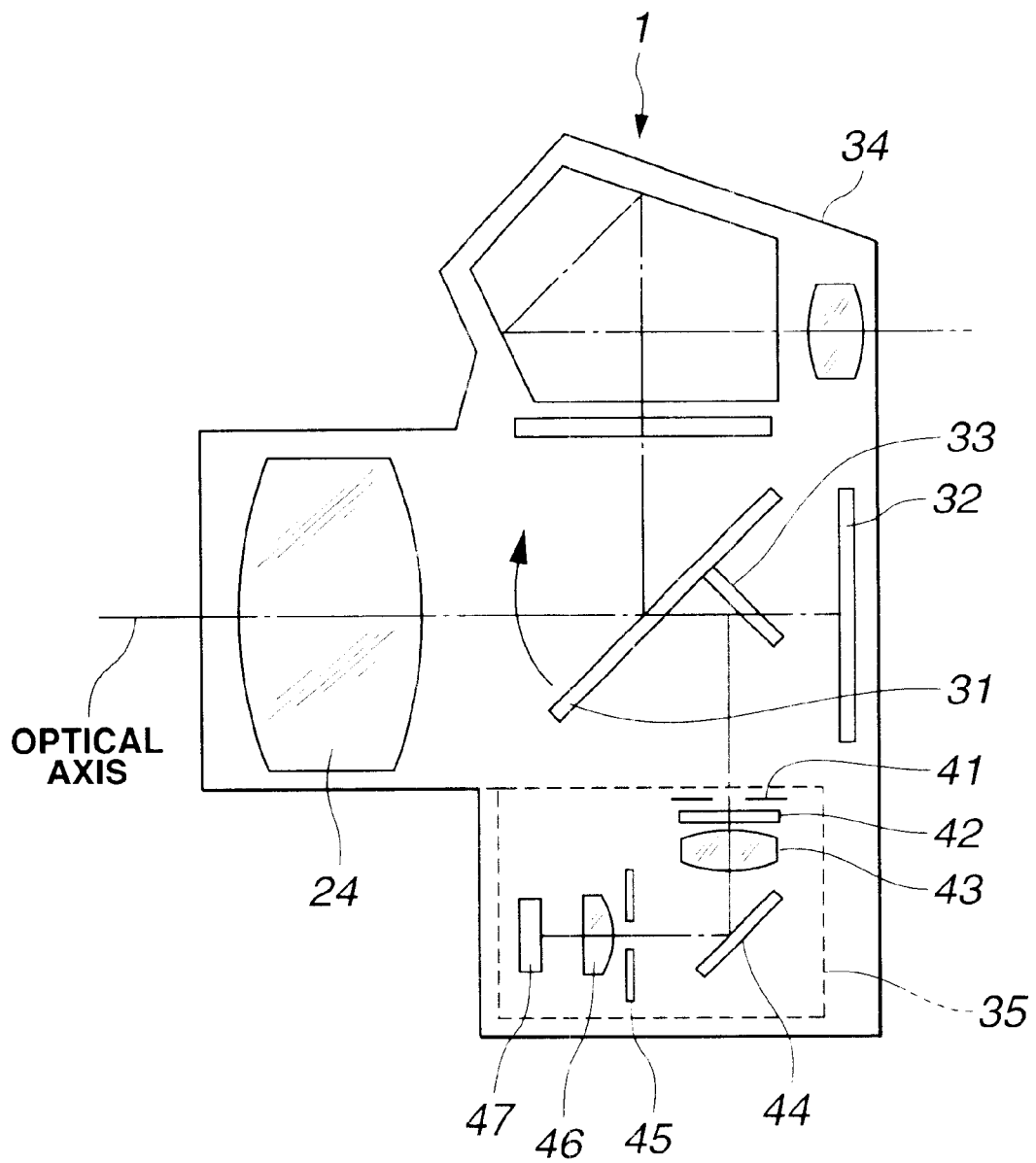
FIG. 3 is an explanatory diagram showing an optical structure of an interior of the camera of the first embodiment.

As shown in FIG. 3, the multiple-point automatic focusing camera of this embodiment includes the aforementioned picture-taking lens 24, a main mirror 31 which reflects part of light flux of the object obtained from the picture-taking lens 24 and allowing part thereof to pass through, a sub mirror 33 which reflects light flux passing through the main mirror 31 and introduces it in a direction different from a direction to a film 32, a finder optical system 34 which is disposed on a light path of light flux reflected by the main mirror 31 to inject an object image visibly and a focal point detecting unit 35 which is disposed on an optical path of light flux reflected by the sub mirror 33 to detect light intensity distribution in the focal point detecting region contained in the object image and obtain a light intensity signal. When the film 32 is exposed, the main mirror 31 and the submirror 33 are sprung up in a direction indicated by an arrow in Figure so that light flux of the object image arrives at the film 32.

The focal point detecting unit 35 comprises a view field mask 41 for squeezing light flux obtained through the sub mirror 33, an infrared ray cut filter 42 for damping infrared ray contained in the light flux passing through the view field mask 41, a condenser lens 43 for collecting light flux passing through the view field mask 41 and the infrared ray cut filter 42, a total reflection mirror 44 for reflecting totally light flux passing through the condenser lens 43, a separator diaphragm mask 45 for controlling light flux obtained through the total reflection mirror 44, a separator lens 46 for refocusing light flux obtained through the separator diaphragm mask 45 and an AF (auto focus) sensor 47 for receiving light flux obtained through the separator lens 46 and converting photoelectrically to obtain a light intensity signal corresponding to light intensity distribution of received light flux.

Figure 4:
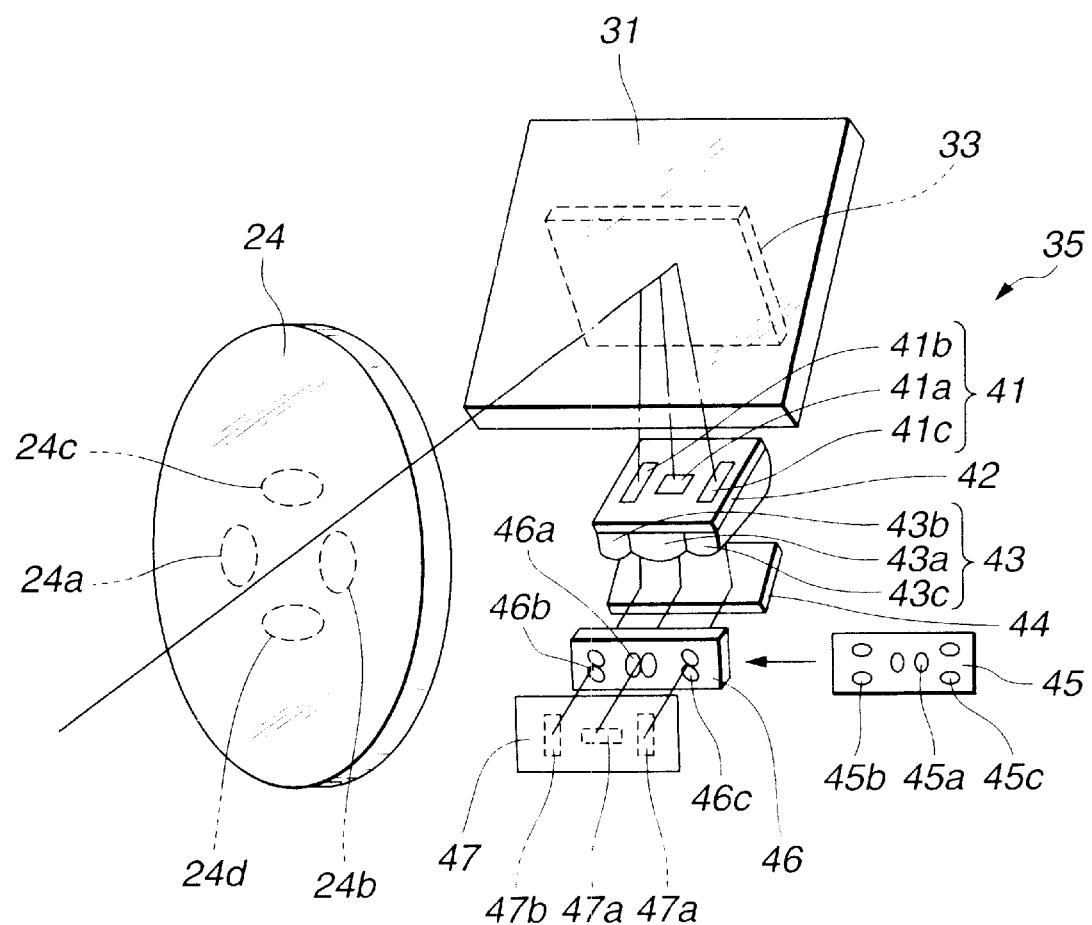
FIG. 4 is an explanatory diagram showing a structure of an optical system of a focal point detecting unit in the camera of the first embodiment.

As shown in FIG. 4, the view field mask 41 has three openings 41a, 41b, 41c for allowing light fluxes for three focal point detecting regions contained in light flux introduced from the sub mirror 33 to pass through. The condenser lens 43 has three condenser lenses 43a, 43b, 43c which are integrally formed corresponding to the aforementioned three openings 41a, 41b, 41c. The separator diaphragm mask 45 has three openings 45a, 45b, 45c provided corresponding to the light fluxes for the three focal point detecting regions so as to divide each of the light fluxes for the three focal point detecting regions, obtained through the aforementioned condenser lenses 43a, 43b, 43c into two light fluxes. The separator lens 46 has three separator lens 46a, 46b, 46c provided corresponding to the light fluxes for the three focal point detecting regions.

The AF sensor 47 has photo diode arrays 47a, 47b, 47c which are photoelectric conversion element arrays provided on each of three focal point detecting regions on a light receiving plane. Light fluxes for the three focal point detecting regions obtained by a focal point detecting optical system comprising the view field mask 41, infrared ray cut filter 42, condenser lens 43, total reflection mirror 44, separator diaphragm mask 45, and separator lens 46 impinge upon the photo diode arrays 47a, 47b, 47c. The photo diode array 47a is disposed long in a direction corresponding to a horizontal direction of the shot area at a position including optical axis while other two photo diode arrays 47b, 47c are disposed in a direction corresponding to a vertical direction of the shot area at positions not including the optical axis.

In the focal point detecting unit 35 having such a structure, focal point detecting light fluxes passing through regions 24a, 24b and regions 24c, 24d having different eye faces of the picture-taking lens 24 are received by the photo diode arrays 47a, 47b, 47c and converted to electric signals indicating light intensity distribution pattern of an image. This light intensity signal is used for focal point computation based on TTL phase difference method which is one method for detecting the focal point.

Figure 5:
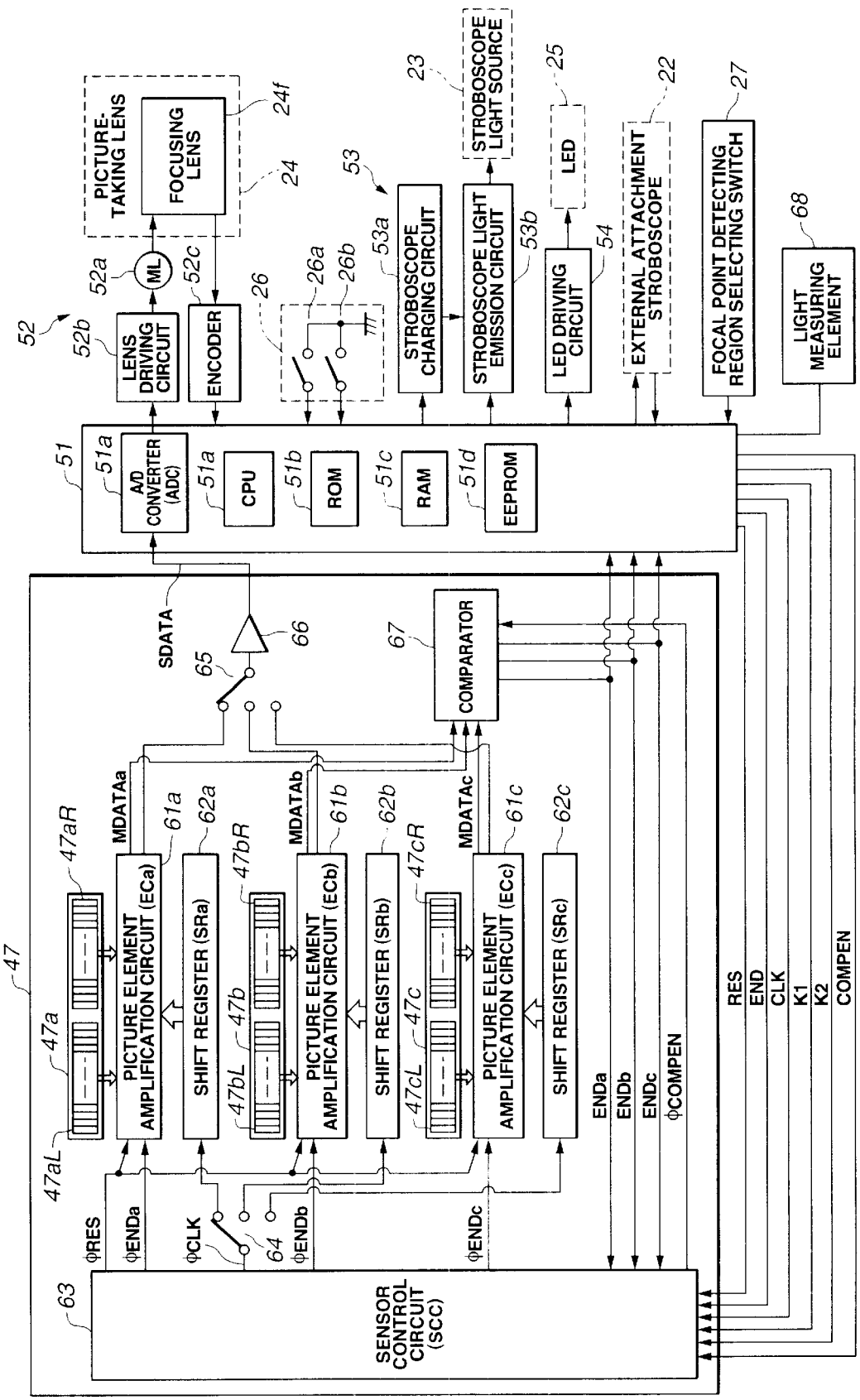
FIG. 5 is a block diagram showing a structure of electric control system for focusing control in the camera of the first embodiment.

As shown in FIG. 5, the main electric control system of the multiple-point automatic focusing camera of this embodiment comprises the AF sensor 47, main control circuit 51 which is a main control circuit for controlling respective portions of the multiple-point automatic focusing camera, focal point adjusting unit 52 for adjusting the focal point of the picture-taking lens 24, release switch 26, stroboscope driving circuit 53 for controlling a drive of the stroboscope light source 23, LED driving circuit 54 for controlling a drive of the LED 25, the focal point detecting region selecting switch 27, light measuring element 68 for detecting luminance of an object and the external attachment stroboscope 22 to be attached as required.

The main control circuit 51 comprises CPU 51a (central operation processing unit), ROM 51b for storing a series of control programs to be executed by the CPU 51a, RAM 51c for storing working data of the CPU 51a, EEPROM 51d for storing various data to be referred by the CPU 51a, and A/D converter (ADC) 51e for converting light intensity signal obtained by the AF sensor 47 from analog signal to digital signal and supplying to the CPU 51a. Correction data relating to auto focusing control, for example, light measurement and the like are stored preliminarily in the EEPROM 51d for each camera.

The focal point adjusting unit 52 comprises a lens driving motor (ML) 52a for driving a focusing lens 24f of the picture-taking lens 24, a lens driving circuit (LD) 52b for controlling a drive of the lens driving motor (ML) 52a and an encoder (EL) 52c for detecting a traveling amount of the focusing lens 24f and supplying a pulse signal indicating this traveling amount to the CPU 51a. The CPU 51a controls this focal point adjusting unit 52 to adjust the focal point of the picture-taking lens 24.

The release switch 26 comprises a first release switch circuit (1R) 26a which is closed by a first step pressing operation so that its output signal is supplied to the CPU 51a and a second release switch (2R) 26b which is closed by a second step pressing operation subsequent to the first step pressing so that its output signal is supplied to the CPU 51a. If the first release switch circuit (1R) 26a is closed, the CPU 51a carries out for example, light measuring control and automatic focusing control. If the second release switch circuit (2R) 26b is closed, for example, exposure control and film windup control are carried out.

The stroboscope driving circuit 53 comprises a stroboscope charging circuit 53a for charging with electric power for driving the stroboscope light source 23 and a stroboscope light emission circuit 53b controlled by the CPU 51a to drive the stroboscope light source 23.

The AF sensor 47 comprises the photo diode arrays (Pa, Pb, Pc) 47a, 47b, 47c, picture element amplification circuits (ECa, ECb, ECc) 61a, 61b, 61c, which accumulate electric charges depending on light intensity of each picture element obtained from each of the photo diode arrays (Pa, Pb, Pc) 47a, 47b, 47c, outputs electric charge accumulation level monitor signals MDATAa, MDATAb, MDATAc indicating electric charge accumulation level and are driven by a supplied readout clock signal to output light intensity signal SDATA of signal level corresponding to the accumulated electric charge level of each picture element, shift registers (SRa, SRb, SRc) 62a, 62b, 62c which divide the supplied readout clock signal φCLK spatially into each picture element unit and supply each to the picture element amplification circuits (ECa, ECb, ECc) 61a, 61b, 61c, a sensor control circuit (SCC) 63 for controlling respective portions of the AF sensor 47, a selector 64 which is controlled by the sensor control circuit (SCC) 63 so as to supply the clock signal φCLK supplied from the sensor control circuit (SCC) 63 to any one of the shift registers (SRa, SRb, SRc) 62a, 62b, 62c selectively, a selector 65 which is controlled by the sensor control circuit (SCC) 63 so as to output the light intensity signal SDATA outputted from any one of the picture element amplification circuits (ECa, ECb, ECc) 61a, 61b, 61c selectively, a buffer 66 which amplifies the light intensity signal SDATA outputted through the selector 65 and supplies to the A/D converter (ADC) 51e of the main control circuit 51, and comparator 67 which monitors electric charge accumulation level monitor signals MDATAa, MDATAb, MDATAc from the picture element amplification circuits (ECa, ECb, ECc) 61a, 61b, 61c, detects that the electric charge accumulation level of each of the picture element amplification circuits (ECa, ECb, ECc) 61a, 61b, 61c arrives at a predetermined level and supplies detection signals ENDa, ENDb, ENDc to the sensor control circuit (SCC) 63 and the CPU 51a.

Each of the photo diode arrays (Pa, Pb, Pc) 47a, 47b, 47c is composed of a pair of photo diode arrays to receive a pair of light fluxes for each of three focal point detecting regions provided by the focal point detecting optical systems. That is, the photo diode array 47a is comprised of a pair of the photo diode arrays 47aL, 47aR. The photo diode array 47b is also comprised of a pair of photo diode arrays 47bL, 47bR. The photo diode array 47c is also comprised of a pair of photo diode arrays 47cL, 47cR. Each of the photo diode arrays 47a, 47b, 47c is composed of multiple photo diodes. Each photo diode generates a signal level corresponding to the amount of impinging light. The signal level of each picture element or signal level of each photo diode is inputted into a circuit portion corresponding to each of the picture element amplification circuits 61a, 61b, 61c.

The picture element amplifications 61a, 61b, 61c accumulate electric charge of each picture element based on the signal level of each picture element obtained from each of the photo diode arrays 47a, 47b, 47c so as to integrate light intensity of each picture element for a predetermined time. If each of the picture element amplification circuits 61a, 61b, 61c is provided with reset signal φRES from the sensor control circuit (SCC) 63 at this time, it resets the accumulated electric charge and then, starts accumulation of electric charge. If signals φENDa, φENDb, φENDc which indicate termination of electric charge accumulation are provided, the accumulation of electric charge is terminated to maintain the accumulated electric charge of each picture element.

The comparator 67 is actuated when a φCOMPEN (comparator enable) signal indicating an operating instruction from the sensor control circuit (SCC) 63 is provided and compares the respective MDATAa, MDATAb, MDATAc with the reference level as described above. At this time, the reference level may be inputted into the AF sensor 47 from an interface IC (not shown).

The sensor control circuit (SCC) 63 controls an entire operation of the AF sensor 47 depending on the control signals RES, END, CLK, K1, K2, COMPEN from the CPU 51a and the signals ENDa, ENDb, ENDc from the comparator 67 in order to control integration of light intensity and reading operation of the light intensity signal. Here, the control signal RES is a signal for instructing a reset or initialization on the AF sensor 47. The control signal END is a signal for instructing a forced termination of integration of light intensity to the AF sensor 47. The control signal COMPEN (comparator enable) is a signal for instructing an instruction of the comparator 67 to the AF sensor 47. The control signal CLK is a clock signal for giving a readout timing of light intensity. The control signals K1, K2 are signals for selecting whether or not light intensity signal are read out from the picture element amplification circuits (ECa, ECb, ECc) 61a, 61b, 61c corresponding to the photo diode arrays (Pa, Pb, Pc) 47a, 47b, 47c according to Table 1.

| K1 | K2 | selected photo diode array |
| --- | --- | --- |
| L | H | photo diode array Pa |
| H | L | photo diode array Pb |
| L | L | photo diode array Pc |
| H | H | not selected |

If the control signal RES is supplied, the sensor control circuit (SCC) 63 outputs a signal φRES, so that accumulated electric charges on the picture element amplification circuits (ECa, ECb, ECc) 61a, 61b, 61c are cleared and then accumulation of electric charge is restarted.

If the signals ENDa, ENDb, ENDc are supplied from the comparator 67, the sensor control circuit (SCC) 63 provides the picture element amplification circuits (ECa, ECb, ECc) 61a, 61b, 61c with corresponding signals φENDa, φENDb, φENDc. If the control signal END is supplied, the sensor control circuit (SCC) 63 provides the picture element amplification circuits (ECa, ECb, ECc) 61a, 61b, 61c with the signals φENDa, φENDb, φENDc.

If the control signal K1, K2 is supplied, the sensor control circuit (SCC) 63 controls the selector 64 and selector 65 according to Table 1 so as to select any one of the photo diode arrays (Pa, Pb, Pc) 47a, 47b, 47c. Consequently, the signal CLK supplied from the main control circuit 51 is supplied to the photo resistors (SRa, SRb, SRc) 62a, 62b, 62c selectively as the signal φCLK, so that the light intensity signals SDATA from the picture element amplification circuits (ECa, ECb, ECc) 61a, 61b, 61c are selectively read out.

Figure 6:
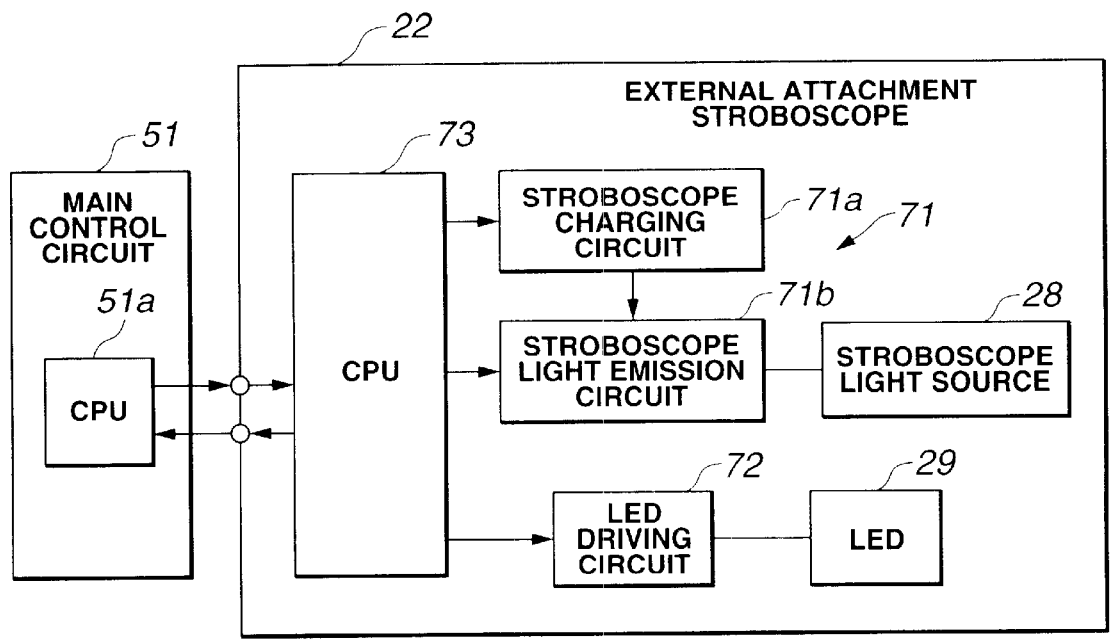
FIG. 6 is a block diagram showing an internal structure of an external attachment stroboscope in the camera of the first embodiment.

As shown in FIG. 6, the external attachment stroboscope 22 comprises the stroboscope light source 28, the LED 29, a stroboscope driving circuit 71 for driving the stroboscope light source 28, a LED driving circuit 72 for driving the LED 29, and CPU 73 having a function for communicating with the CPU 51a of the main control circuit 51 and controlling the stroboscope driving circuit 71 and the LED driving circuit 72 corresponding to a control from the CPU 51a. The stroboscope driving circuit 71 comprises a stroboscope charging circuit 71a having a capacitor for charging with electric power for making the stroboscope light source 28 emit a flash light and a stroboscope light emission circuit 71b which is an electric circuit for making the stroboscope light source 28 emit a flash light corresponding to a control from the CPU 73. Although according to this embodiment, CPU 73, the stroboscope driving circuit 71 and the LED driving circuit 72 are contained in the external attachment stroboscope 22, all or part of these functions may be contained in the camera main body 21.

Figure 7:
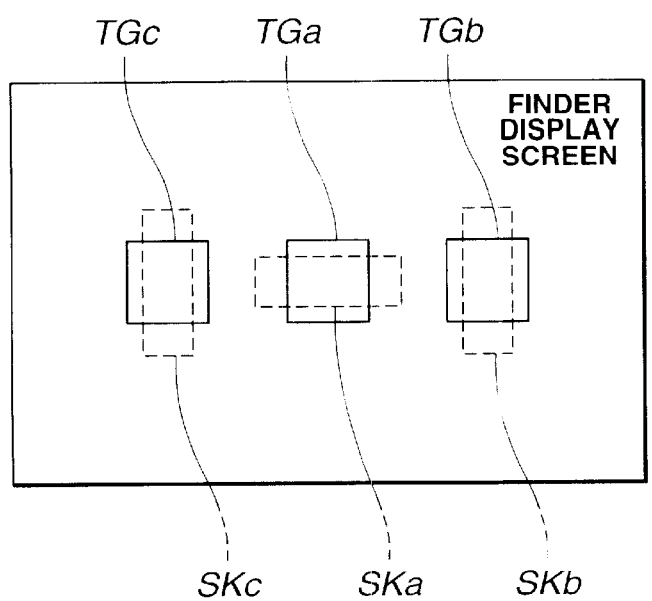
FIG. 7 is an explanatory diagram showing a positional relationship between finder display screen and focal point detecting region in the camera of the first embodiment.

As shown in FIG. 7, for example, rectangular target indications TGa, TGb, TGc indicating a position of the focal point detecting region are displayed at positions corresponding to the focal point detecting regions SKa, SKb, SKc (indicated by dot lines in Figure) by the focal point detecting unit 35 on a finder display screen projected from the finder optical system 34.

With the above described structure, focal point detection is carried out by the TTL phase difference method which is a method for detecting the focal point. Three pairs of focal point detecting light fluxes obtained by dividing each of three focal point detecting light fluxes to two parts are received by three pairs of the photo diode arrays 47a, 47b, 47c. Three pairs of image light intensity patterns are converted to electric signals and an interval between each pair of the light intensity distribution is obtained by correlation computation. Consequently, automatic focal point detection is carried out and according to a focusing amount obtained by this automatic focal point detection, the picture-taking lens 24 is driven so that automatic focal point adjustment is carried out.

Figure 8:
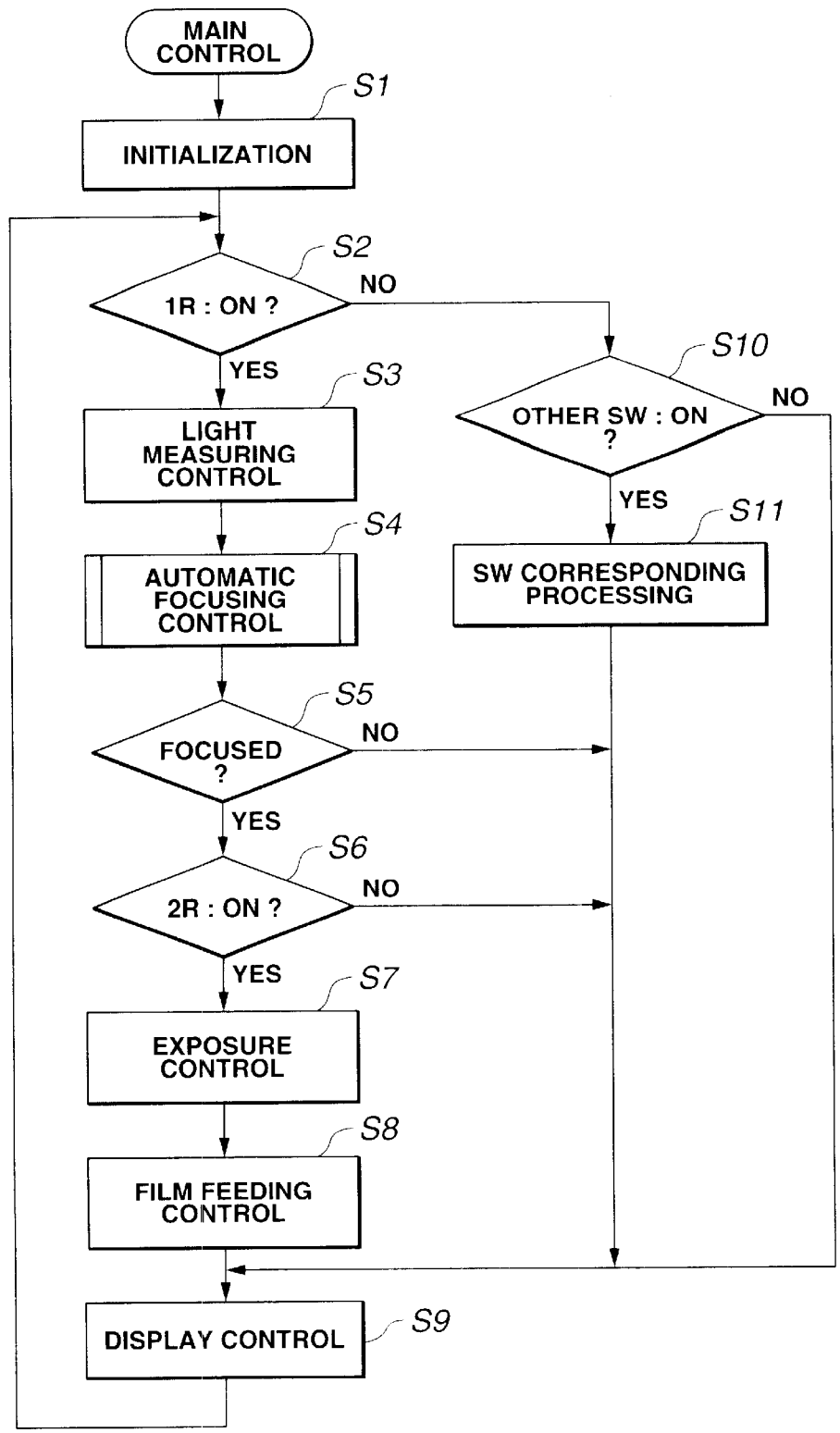
FIG. 8 is a flow chart showing an operation flow of main control in the camera of the first embodiment.
Figure 9:
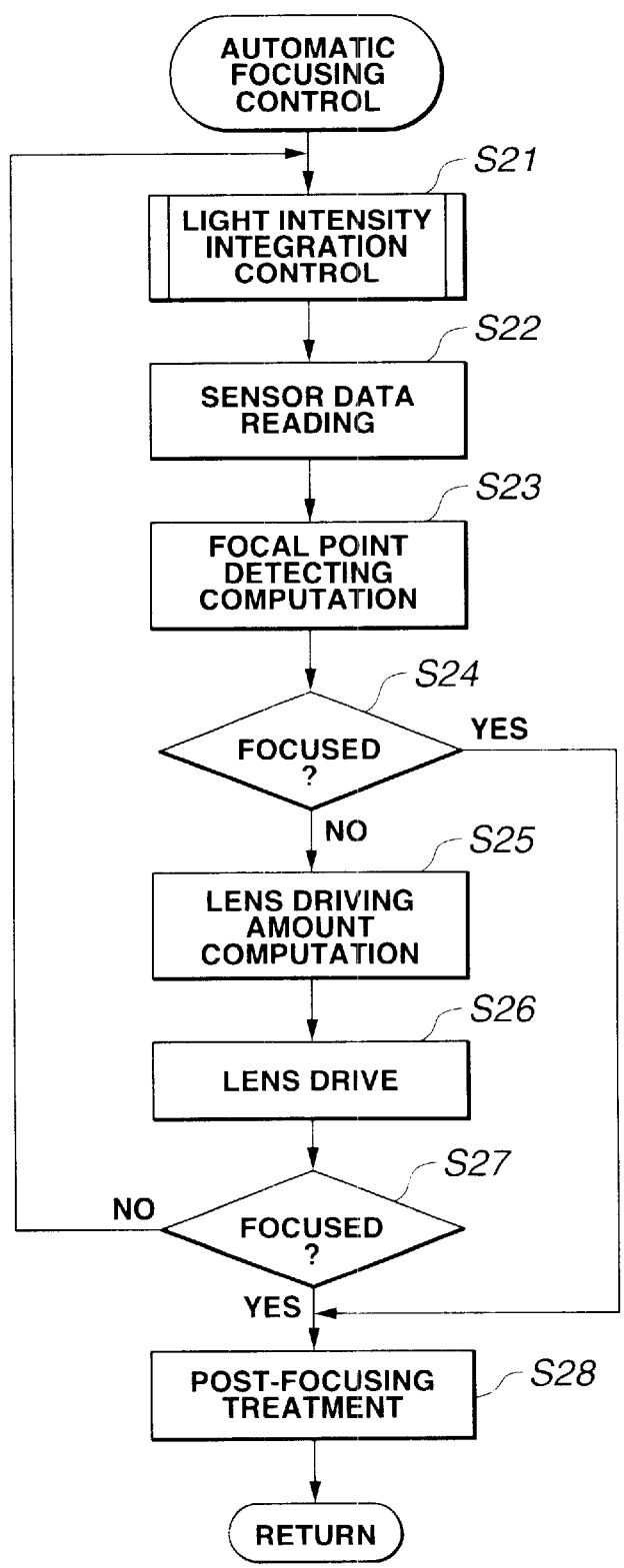
FIG. 9 is a flow chart showing an operation flow of automatic focusing control in the camera of the first embodiment.

Next, an operation of this embodiment will be described. FIG. 8 shows a flow of main control operation of the CPU 51a. First, respective parts of the camera are initialized in step S1 so that standby state which allows photographing is achieved. In the initialization of the camera, camera mechanism such as zoom mechanism (not shown) is initialized, I/O port (not shown) of the CPU 51a is initialized and the AF sensor 47 is initialized by the RES signal.

In step S2, a state of the first release switch circuit (1R) 26a is checked. If the circuit is ON, processing proceeds to next step S3. If it is OFF, processing is diverted to step S10.

In subsequent step S3, light measurement control is carried out and then processing proceeds to step S4. In this light measurement control, the light measuring element 68 is controlled and luminance of an object is measured by the light measuring element 68. A light measurement value is obtained by light measurement processing according to the obtained luminance information. An exposure amount, that is, an diaphragm value and shutter speed are obtained according to this light measurement value.

In subsequent step S4, automatic focusing control is carried out and then processing proceeds to step S5. In this automatic focusing control, a focal point to an object is detected and focal point adjustment is carried out to the picture-taking lens 24 corresponding to this detected focal point. Meanwhile, the automatic focusing control will be described in detail.

In subsequent step S5, whether or not focusing is achieved in the automatic focusing control of step S4 is determined. If focusing is achieved, processing proceeds to step S6. If focusing is not achieved, processing is skipped to step S9.

In step S6, a condition of the second release switch circuit (2R) 26b is checked. If it is ON, processing proceeds to next step S7 and if it is OFF, processing is skipped to step S9.

In step S7, exposure control is carried out and processing proceeds to next step S8. In this exposure control, a diaphragm (not shown) of the picture-taking lens 24 is driven according to an diaphragm value obtained in the light measurement control of step S3 so that an diaphragm of the picture-taking lens 24 is decreased. Exposure is carried out for a predetermined time by control of a shutter (not shown). After the exposure by the shutter is terminated, the diaphragm is released to its original state.

In step S8, film feeding control is carried out. Then, processing proceeds to step S9. In this film feeding control, after taking a picture, the film is wound up so that its film position is fed to a next frame position.

In step S9, for example, a liquid crystal display (LCD) or a display unit (not shown) composed of LCD is controlled so that a camera state is displayed on this display unit. If a series of photographing operation from step S1 to step S9 is finished, processing is returned to step S2, from which the same processing is restarted.

On the other hand, if processing is transferred from step S2 to step S10, whether or not other switches not shown here (abbreviated as SW in Figure) than the release switch 26 are operated is determined in this step S10. If the other switch is operated, processing proceeds to step S11. Unless the other switch is operated, processing is skipped to step S9. In subsequent step S11, a processing corresponding to a switch which is determined to be operated in step S10 is carried out and then processing proceeds to step S9.

Next, a flow of the aforementioned automatic focusing control (see step S4 of FIG. 8) by the CPU 51a will be described in detail. As shown here, in the automatic focusing control, first of all, light intensity integration control shown in step S21 is carried out and then processing proceeds to step S22. In this light intensity integration control, the AF sensor 47 is controlled and electric charge accumulation corresponding to light intensity levels obtained by the photo diode arrays 47a, 47b, 47c are carried out by the picture element amplification circuits 61a, 61b, 61c so as to obtain light intensity data for use in focal point detection. If it is determined that a supplemental light is necessary for obtaining light intensity data, the electric charge accumulation is carried out while the supplemental light is projected. As required, electric charge accumulation time change control is carried out. Meanwhile, this light intensity integration control will be described in detail later.

In subsequent step S22, the AF sensor 47 is controlled by the readout clock signal CLK and control signal K1, K2 so as to read out sensor data or signal indicating light intensity data obtained by the AF sensor 47. This light intensity signal is converted to digital signal by the A/D converter 51e and stored in the RAM 51c.

In step S23, focal point detecting computation is carried out according to light intensity data stored in the RAM 51c. The signals END, ENDa, ENDb, ENDc having a role of flag indicating termination of integration of light intensity or the like state are initialized so as to be available for next light intensity integration processing.

In step S24, whether or not defocus amount obtained in the focal point detecting computation of step S23 is within an allowable range is determined so as to determine whether or not focusing is achieved currently. If focusing is not achieved, processing proceeds to next step S25 and if focusing is achieved, processing is skipped to step S28.

In step S25, a driving amount of the focusing lens 24f of the picture-taking lens 24 is computed according to a defocus amount obtained in focal point detecting computation of step S23. Then, in step S26, the focal point adjusting unit 52 is controlled and the focal point of the picture-taking lens 24 is adjusted according to the lens driving amount obtained in the above described step S25.

Instep S27, whether or not focusing is achieved as a result of focal point adjustment of the step S26 is determined. If focusing is achieved, processing proceeds to next step S28. If focusing is not achieved, processing is returned to step S21, in which automatic focusing control is restarted and repeated until focusing is reached.

In next step S28, post treatment after focusing is carried out so as to terminate the automatic focusing control. In this post treatment, for example, a LED (not shown) in the finder optical system 34 is lit or a sound means (not shown) is driven so as to notify a photographing person that focusing is achieved.

Next, a flow of the light intensity integration control (see step S21 of FIG. 9) by the CPU 51a will be described in detail with reference to FIG. 10. As in step S31 of FIG. 10, in the light intensity integration control, first of all, the AF sensor 47 is reset so that light intensity integration by the AF 47 sensor is started. At the same time, measurement of integration time by a timer (not shown) in the CPU 51a is started.

In subsequent steps S32, S33, S34, whether or not supplemental light is necessary for detection of the focal point is determined and if the supplemental light is necessary, a type of the supplemental light source is determined. First of all, in step S32, whether or not the supplemental light is necessary for the focal point detection, and if the supplemental light is necessary, processing proceeds to step S33, in which next determination is carried out. If the supplemental light is not necessary, processing is transferred to step S41, in which light intensity is integrated without use of the supplemental light. In determining whether or not the supplemental light is necessary, if in step S3 of FIG. 8, luminance of an object detected by the light measuring element 68 is below a predetermined luminance, it is determined the supplemental light is necessary. If the luminance is higher than the predetermined luminance, it is determined that the supplemental light is not necessary.

In subsequent step S33, a setting condition of the focal point detecting region selecting switch 27 is checked or whether or not the camera automatically selects multi-point AF is determined. If other operation than the multiple-point automatic focal point detection or non multiple-point automatic focal point detection is selected by this focal point detecting region selecting switch 27, processing proceeds to step S34, in which next determination is carried out. If the multiple-point automatic focal point detection is selected, processing proceeds to step S51, in which light intensity integration using stroboscope light source is carried out.

In step S34, a setting condition of the focal point detecting region selecting switch 27 is checked. If a focal point detecting region SKa substantially in the center of a shot area is not selected as a focal point detecting region, processing proceeds to step S51, in which light intensity integration using the stroboscope light source is carried out. If the focal point detection region SKa is selected as a focal point detecting region, processing proceeds to step S61, in which light intensity integration using the LED light source is carried out.

In step S41 to be executed in case where it is determined that the supplemental light is not necessary in the above described step S32, whether or not the integration time passes by, for example, 100 ms is determined. If a predetermined time does not pass, processing proceeds to step S42. If a predetermined time passes, processing is skipped to step S43.

In step S42, output signals ENDa, ENDb, ENDc of the comparator 67 are checked. If light intensity integrations are finished in all three focal point detecting regions SKa, SKb, SKc, the light intensity integration control is terminated. If the light intensity integration is not finished in any of the regions, processing is returned to the step S41.

Instep S43, forced termination processing is carried out, so that the light intensity integration control is terminated. In this forced termination processing, a forced termination signal END is supplied from the CPU 51a to the AF sensor 47 and consequently, the light intensity integration processing by the AF sensor 47 is terminated by force.

In step S51 to be executed if it is determined that the stroboscope is used as the supplemental light in the steps S33, S34, the stroboscope light source 23 is driven so that it makes a flash once. Meanwhile if the external attachment stroboscope 22 is mounted, the stroboscope light source 28 is driven to make a flash once instead of the stroboscope light source 23.

Instep S52, a predetermined waiting time is secured. This waiting time is provided to secure a predetermined stroboscope light emission time interval.

In subsequent step S53, a number of flashes of the stroboscope supplemental light in step S51 is checked. If the number of flashes reaches a predetermined time, for example, 20 times, processing proceeds to the forced integration termination processing of the step S43, so that the light intensity integration control is terminated. If the predetermined time is not reached, processing proceeds to next step S54.

In step S54, the output signals ENDa, ENDb, ENDc of the comparator 67 are checked. If the light intensity integrations are terminated in all the three focal point detecting regions SKa, SKb, SKc, the light intensity integration control is terminated. If the light intensity integration is not terminated in any region, processing is returned to the step S51 so that the supplemental light flash by the stroboscope is repeated.

In step S61 to be executed if it is determined that the LED is used as the supplemental light in the steps S33, S34, the LED 25 is driven and lit. If the external attachment stroboscope 22 is equipped, the LED 29 is driven and lit instead of the LED 25.

In subsequent step S62, whether or not the integration time passes by a predetermined time, for example, 100 ms is determined. If the predetermined time does not pass, processing is transferred to next step S63. If the predetermined time passes, lighting of the LED is stopped in step S65. After that, the processing is transferred to the forced integration termination processing of the previous step S43, in which the light intensity integration control is terminated.

In subsequent step S63, the output signals ENDa, ENDb, ENDc of the comparator 67 are checked. If the light intensity integrations are terminated in all the three focal point detecting regions SKa, SKb, SKc, lighting of the LED supplemental light source is stopped in step S64, so that the light intensity integration control is terminated. If the light intensity integration is not terminated in any region, processing is returned to the step S62.

Figure 11:
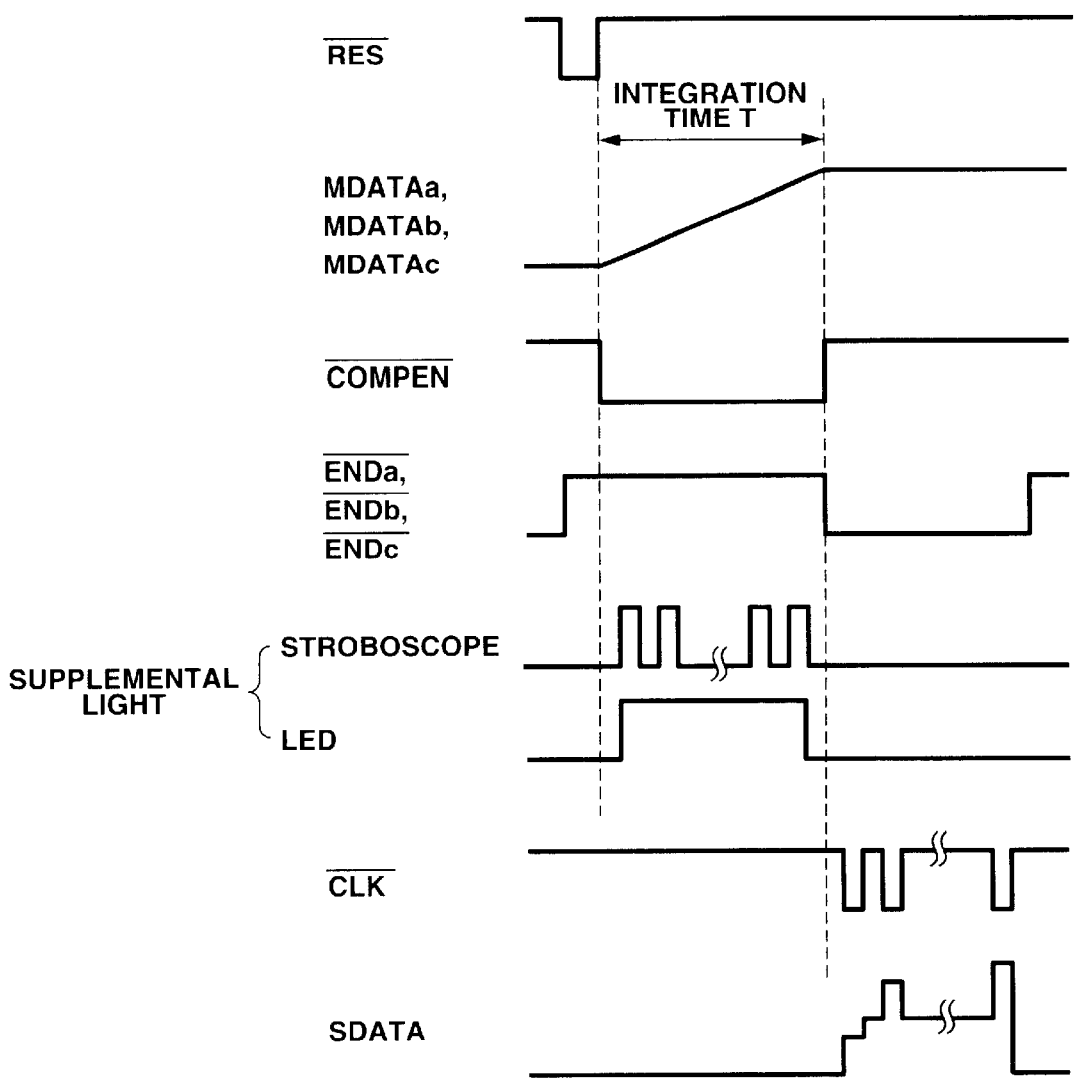
FIG. 11 is a timing chart showing an operation timing of major signals relating to light intensity integration in the camera of the first embodiment.

Next, an operation timing of major signals relating to the light intensity detection will be described with reference to FIG. 11. If the reset signal RES is supplied from the CPU 51a to the AF sensor 47, respective circuits in the AF sensor 47 are initialized by the sensor control circuit (SCC) 63. At the same time, electric charge accumulation operation by the photo diode arrays (Pa, Pb, Pc) 47a, 47b, 47c and the picture element amplification circuits (ECa, ECb, ECc) 61a, 61b, 61c is started. During the electric charge accumulating operation, monitor signals MDATAa, MDATAb, MDATAc corresponding to the electric charge accumulation level are outputted by the picture element amplification circuits (ECa, ECb, ECc) 61a, 61b, 61c. During the electric charge accumulating operation, the COMPEN signal is valid and the monitor signals MDATAa, MDATAb, MDATAc are monitored by the comparator 67.

If it is determined that the supplemental light is necessary because of shortage of luminance of an object, the supplemental light by the stroboscope light sources 23, 28 or LED 25, 29 is emitted during electric charge accumulating operation. If the stroboscope light source 23, 28 are used as the supplemental light source, the stroboscope light sources 23, 28 emit light intermittently at a predetermined interval, that is, an interval of several $\mu$s multiple times. If the LEDs 25, 28 are used, the LEDs 25, 28 continue to be lit during the electric charge accumulation.

If the monitor signals MDATAa, MDATAb, MDATAc reach a predetermined level, the electric charge accumulation is terminated corresponding to the accumulation termination signals ENDa, ENDb, ENDc outputted from the comparator 67 and at the same time, the COMPEN signal is made invalid.

If the light intensity integration by electric charge accumulation is terminated, a readout clock signal CLK of light intensity signal is supplied from the CPU 51a to the AF sensor 47. The picture element amplification circuits (ECa, ECb, ECc) 61a, 61b, 61c are driven by the shift registers (SRa, SRb, SRc) 62a, 62b, 62c operating corresponding to this clock signal CLK. Light intensity signals SDATA are read out successively from this picture element amplification circuits (ECa, ECb, ECc) 61a, 61b, 61c. The read out light intensity signal is converted from analog to digital by the A/D converter 51e and stored in the RAM 51c.

Next, an operation of the light intensity integration will be described with reference to FIGS. 12 to 14. A shot screen shown in FIG. 12 contains, for example, a main object image 91 which is a human figure located near a camera, a building image 92 and a background image 93 such as night scene. In this shot screen, the main object image 91 is locates at the focal point detecting region SKa substantially in the center of the shot screen, but at the focal point detecting region SKb located in the periphery, out of irradiation ranges of the LEDs 25, 29. That is, the supplemental lights from the LEDs 25, 29 are projected substantially to the center of the shot screen, not up to the periphery.

Figure 12:
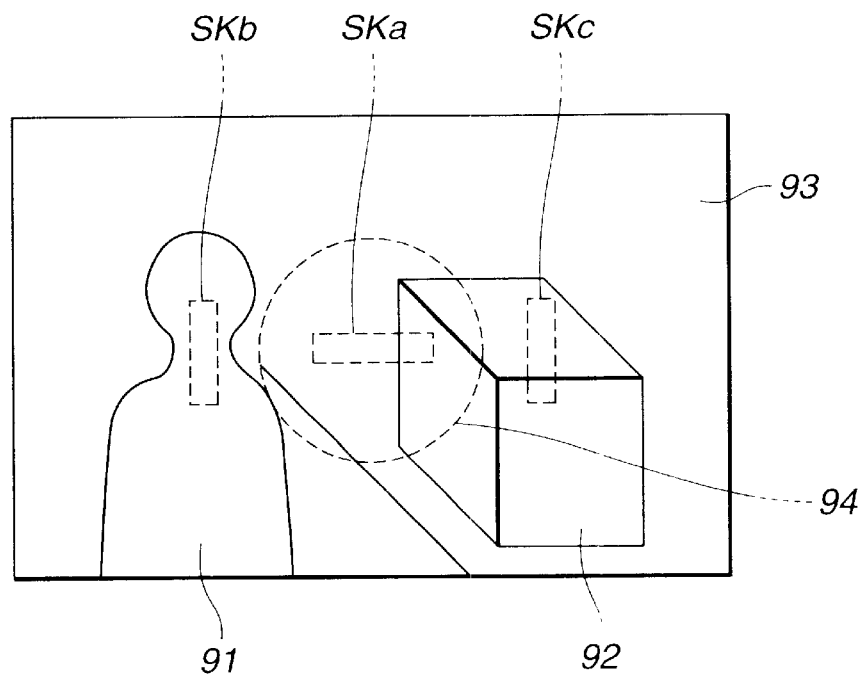
FIG. 12 is an explanatory diagram showing an example of disposition of an object in an image screen in the camera of the first embodiment.
Figure 13:
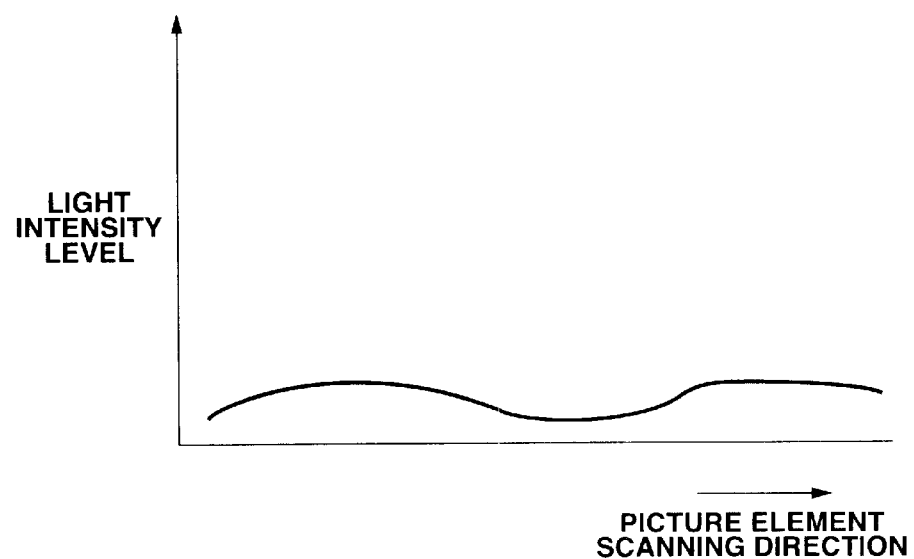
FIG. 13 is an explanatory diagram showing light intensity level in case where no supplemental light is irradiated to an object in the camera of the first embodiment.
Figure 14:
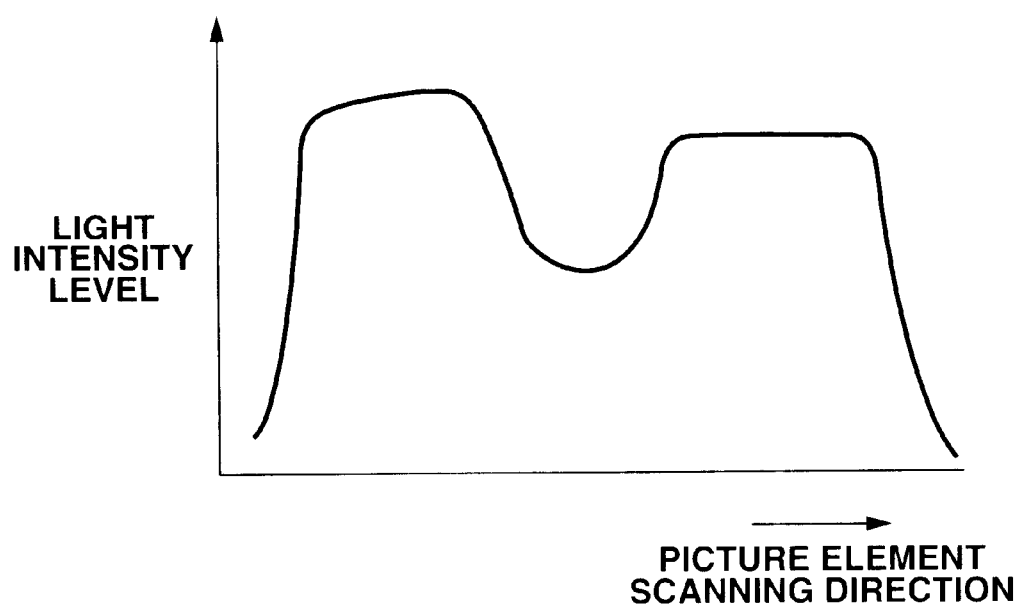
FIG. 14 is an explanatory diagram showing light intensity level in case where the supplemental light is irradiated to the object in the camera of the first embodiment.

Because the main object image 91 is located out of the irradiation range of the LEDs 25, 29 when the shot screen as shown in FIG. 12 is taken, if the supplemental light is not projected to the main object image 91, a sufficient light intensity cannot be obtained near the main object image 91 as shown in FIG. 13, so that the focusing on the main object image 91 is not carried out. Thus, if it is intended to carry out focusing on the main object image 91, a sufficient light intensity is necessary near the main object image 91 as shown in FIG. 14. If in this case, the stroboscope supplemental light is projected to the focal point detecting region SKb on which the LED supplemental light is not projected according to this embodiment, the sufficient light intensity and contrast are secured near the main object image 91 as shown in FIG. 14, so that the focusing on the main object image 91 is carried out securely.

As described above, according to this embodiment, the supplemental light can be projected to the focal point detecting region SKa in the center of the screen by the supplemental light source composed of the LEDs 25, 29. As a result, even at the time of a low luminance, the focal point can be detected in the focal point detecting region SKa in the center of the screen.

By using the stroboscope light sources 23, 28 as the supplemental light source, the supplemental light can be projected to the focal point detecting regions SKb, SKc in the periphery of the screen, excluding the focal point detecting region SKa in the center of the screen. As a result, even at the time of a low luminance, the focal point can be detected in the focal point detecting regions SKb, SKc in the periphery of the screen.

The supplemental light source composed of the LEDs 25, 29 projects light to the focal point detecting region SKa in the center of the screen, but not to the focal point detecting regions SKb, SKc in the periphery. Thus, dimension of the supplemental light source composed of the LEDs 25, 29 is suppressed so that production cost thereof is also suppressed. Because the stroboscope light sources 23, 28 are provided for illumination upon photographing, even if this is used as the supplemental light, the dimension of the supplemental light source is not increased.

Therefore, according to this embodiment, there is such an effect that the focal point can be detected in any focal point detecting region even at the time of a low luminance, while suppressing the dimension of the supplemental light source.

Because according to this embodiment, the stroboscope light source 23, 28 and the LEDs 25, 29 can be selectively used depending on the focal point detecting region, an advantage of the stroboscope light sources 23, 28 which are capable of securing a wide light distribution angle and an advantage of the LEDs 25, 29 which are capable of reducing dazzling and securing a high focal point detecting accuracy with a low power consumption are available.

Although according to this embodiment, the photo diode arrays 47a, 47b, 47c as a light receiving element of the AF sensor 47 are used, this embodiment is not restricted to such a structure, but it is permissible to use ,for example, an image pickup device such as charge coupled device (CCD).

Further, instead of the supplemental light source composed of the LEDs 25, 29, it may be composed of, for example, light emission device such as lamp.

Although according to this embodiment, three focal point detecting regions are used, more focal point detecting regions may be disposed or such regions may be disposed in a substantially entire range of the screen.

Even if the external attachment stroboscope 22 is mounted, when the LED is selected as the supplemental light source, the CPU 51a may control so that the incorporated LED 25 is always used.

Figure 15:
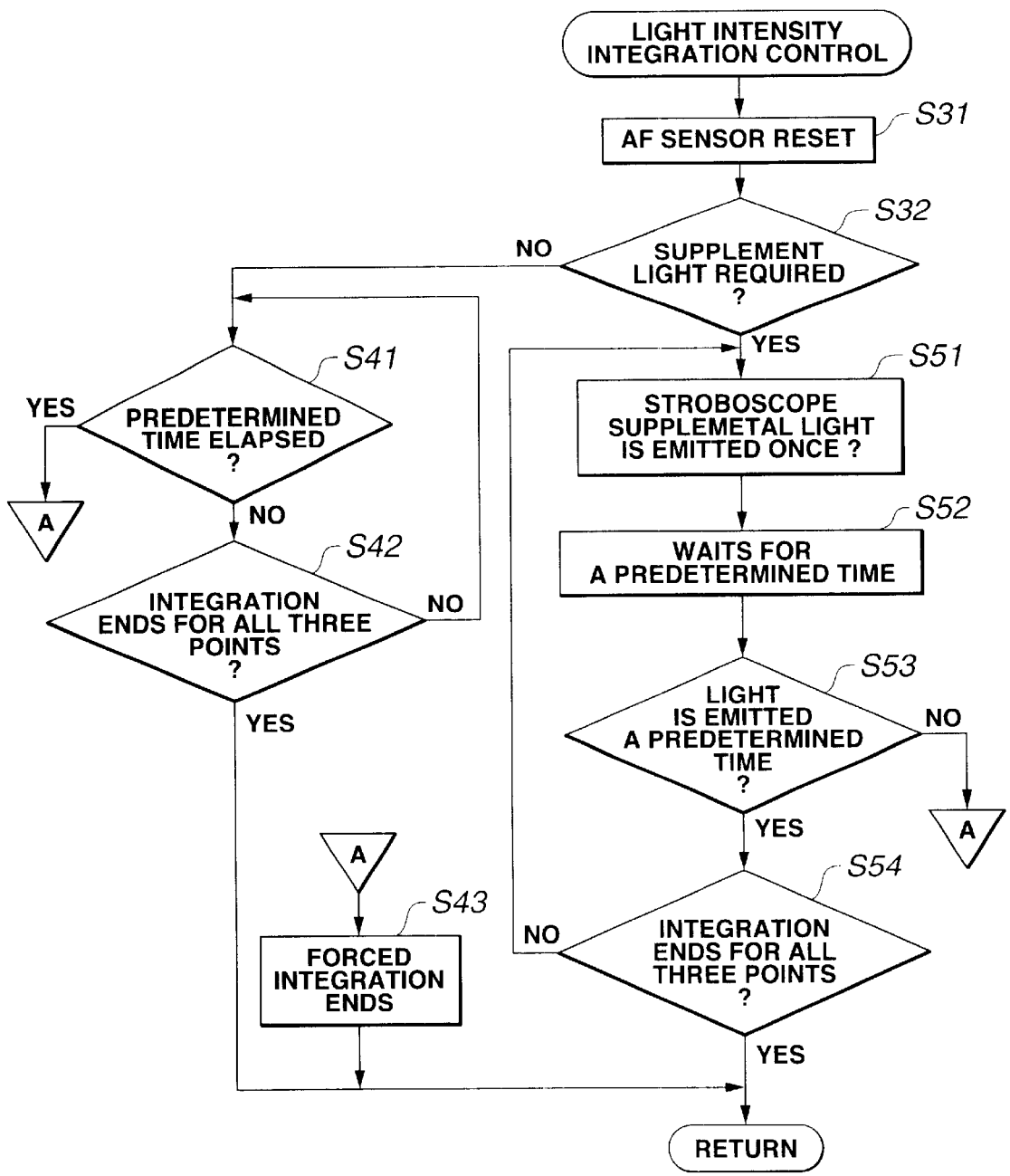
FIG. 15 is a flow chart showing an operation flow of light intensity integration control in the camera of a second embodiment of the present invention.

Next, a second embodiment of the present invention will be described. FIG. 15 is a flowchart showing an operation flow of light intensity integration control concerning the second embodiment of the present invention. According to this embodiment, like reference numerals are attached to components constructed in the same manner as and control steps having the same function as the first embodiment and a description thereof is omitted.

The hardware configuration of the multiple-point automatic focusing camera of the second embodiment is substantially the same as the first embodiment, and however the LEDs 25, 29 (see FIG. 2) are removed as compared to the first embodiment.

Next an operation of the second embodiment will be described. According to the second embodiment, a description of a common operation to the first embodiment is omitted. As shown in FIG. 15, according to the second embodiment, part of the flow of the light intensity integration control is different from the first embodiment (see FIG. 10). In the light intensity integration control of the second embodiment, steps S61 to S65 (see FIG. 10) relating to light emission control of the LED supplemental light are removed as compared to the first embodiment and accompanied thereby, steps S33 to S34 (see FIG. 10) for determining the type of the supplemental light for use are removed.

Thus, according to the second embodiment, if the supplemental light is necessary, the stroboscope light sources 23, 28 are used as the supplemental light source regardless of the state of the focal point detecting region selecting switch 27.

Even if the external attachment stroboscope 22 is mounted, the CPU 51a may make control so as to always use the incorporated stroboscope light source 23.

As described above, according to the second embodiment, by using the stroboscope light sources 23, 28 as the supplemental light source, the supplemental light can be projected to the focal point detecting regions SKa in the center of the screen and the focal point detecting regions SKb, SKc in the periphery, so that the focal point can be detected in any focal point detecting region even at the time of a low luminance.

Because the stroboscope light sources 23, 28 are provided for illumination upon photographing, even if they are used as the supplemental light source, the dimension is not increased. Therefore, according to the second embodiment, there is such an effect that the focal point can be detected in any focal point detecting region even at the time of a low luminance while suppressing the dimension of the supplemental light source.

Further, because according to the second embodiment, any LED other than the stroboscope light sources 23, 28 is not provided as the supplemental light source, the size of the camera can be suppressed by that amount, thereby reducing the production cost. Further, it is not necessary to design the LED for the supplemental light source.

Figure 16:
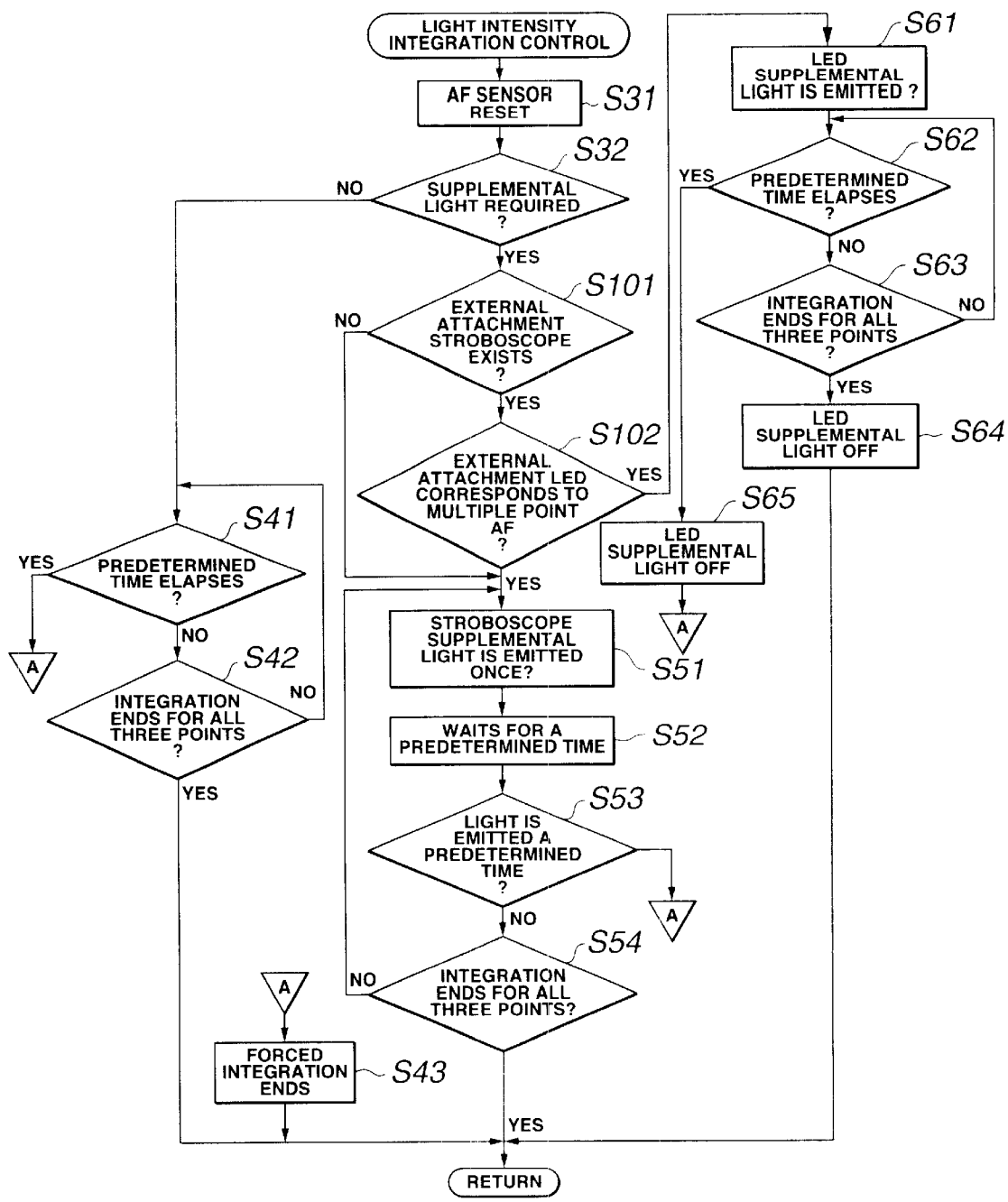
FIG. 16 is a flow chart showing an operation flow of light intensity integration control in the camera of a third embodiment of the present invention.

Next, a third embodiment of the present invention will be described. FIG. 16 is a flow chart showing a flow of the light intensity integration control according to the third embodiment. Meanwhile, like reference numerals are attached to components constructed in the same manner as and control steps having the same function as the first embodiment and a description thereof is omitted.

Although the multiple-point automatic focusing camera of the third embodiment has substantially the same structure as the first embodiment, the LED 25 (see FIG. 2) incorporated in the camera is removed. The CPU 73 incorporated in the external attachment stroboscope 22 (see FIG. 6) has a function for transmitting information about whether or not the LED 29 incorporated in the external attachment stroboscope 22 corresponds to multiple point automatic focusing or information about whether or not the focal point detecting region in the periphery is contained in the irradiation range of the supplemental light by the LED 29 to the CPU 51a of the main control circuit 51.

Next, an operation of the third embodiment will be described. According to the third embodiment, an operation common to the first embodiment is omitted.

Figure 10:
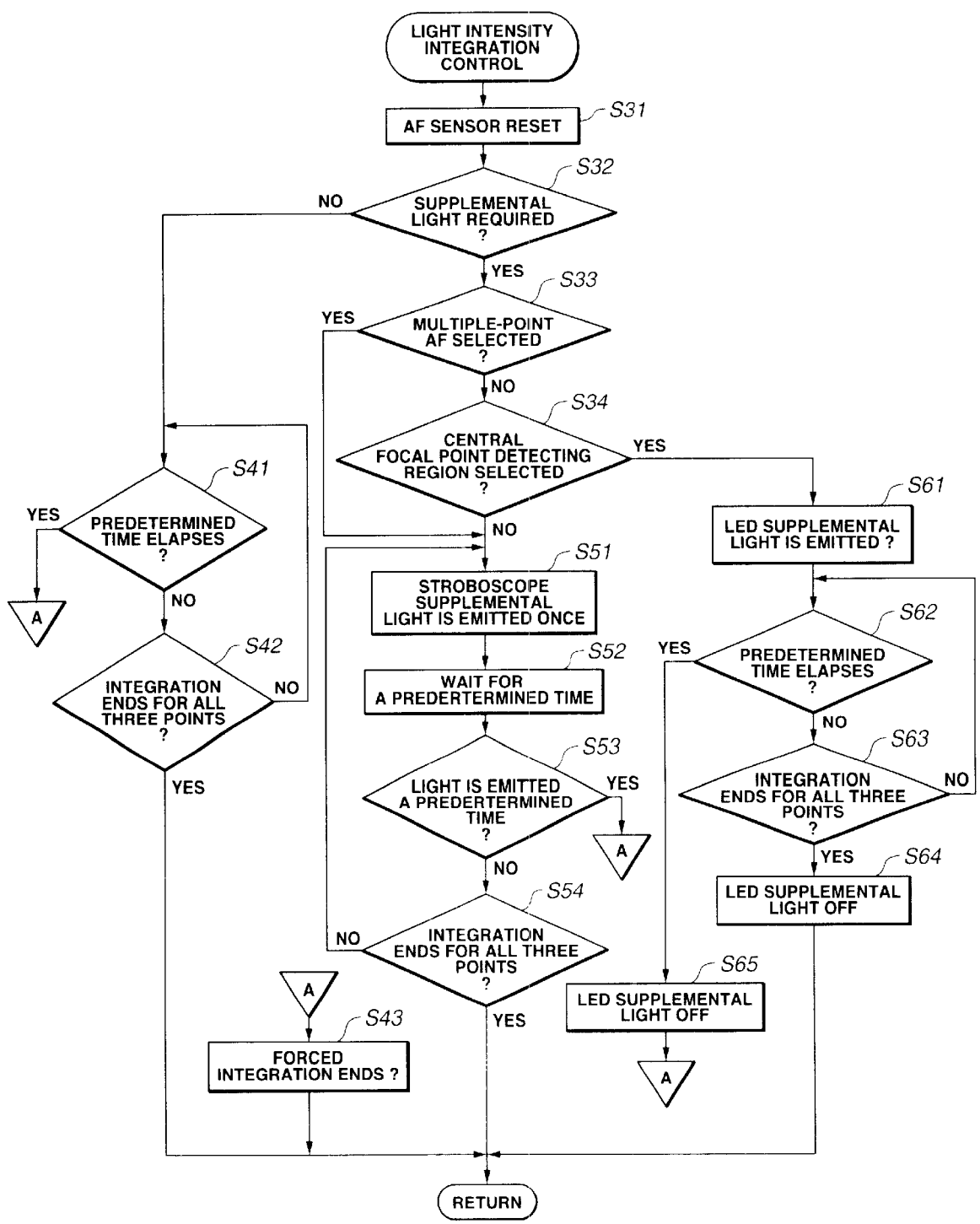
FIG. 10 is a flow chart showing an operation flow of light intensity integration control in the camera of the first embodiment.

As shown in FIG. 16, according to the third embodiment, a flow of control on determining the type of the light source for use is different from the first embodiment (see FIG. 10). Instead of the steps S33–S34 (see FIG. 10) of the first embodiment, steps S101–S102 are executed.

That is, in step S101, whether or not the external attachment stroboscope 22 is attached to the camera main body 21 is determined. If the external attachment stroboscope 22 is mounted, processing proceeds to next step S102. If the external attachment stroboscope 22 is not mounted, processing is transferred to step S51. The CPU 51a determines whether or not the external attachment stroboscope 22 is mounted depending on whether or not it is capable of communicating with the CPU 73 of the external attachment stroboscope 22. Meanwhile if processing is transferred from step S101 to step S51, the stroboscope light source 23 incorporated in the camera is driven to emit flash light as the supplemental light source in step S51.

In subsequent step S102, whether or not the LED 29 of the external attachment stroboscope 22 corresponds to multiple-point automatic focal point detection or whether or not the focal point detecting region in the periphery is included in the irradiation range of the supplemental light by the LED 29 is determined. If the LED 29 does not correspond to the multiple-point automatic focal point detection, processing proceeds to step S51. If the LED 29 corresponds to the multiple-point automatic focal point detection, processing proceeds to step S61. At this time, the CPU 51a make that determination by obtaining information about whether or not the LED 29 of the external attachment stroboscope 22 corresponds to multiple-point automatic focal point detection from the CPU 73 of the external attachment stroboscope 22.

According to the third embodiment, when processing proceeds from step S102 to step S51, the stroboscope light source 28 of the external attachment stroboscope 22 is used as the supplemental light source. Further, when processing is transferred from step S102 to step S61, the LED 29 of the external attachment stroboscope 22 is used as the supplemental light source.

As described above, according to the third embodiment, when the external attachment stroboscope 22 is not mounted, by using the incorporated stroboscope light source 23 as a supplemental light source, the supplemental light can be projected to the focal point detecting region SKa in the center of the screen and focal point detecting regions SKb, SKc in the periphery. As a result, the focal point can be detected in any focal point detecting region even at the time of a low luminance.

If the external attachment stroboscope 22 is mounted and the LED 29 of the external attachment stroboscope 22 does not correspond to the multi-point focal detection, by using the stroboscope light source 28 of the external attachment stroboscope 22 as the supplemental light source, the supplemental light can be projected to the focal point detecting region SKa in the center of the screen and focal point detecting regions SKb, SKc in the periphery, so that the focal point can be detected in any focal point detecting region even at the time of a low luminance.

Further, if the external attachment stroboscope 22 is mounted and the LED 29 of the external attachment stroboscope 22 corresponds to the multiple-point focal point detection, by using the LED 29 of the external attachment stroboscope 22 as the supplemental light source, the supplemental light can be projected to the focal point detecting region SKa in the center of the screen and the focal point detecting regions SKb, SKc in the periphery. As a result, the focal point can be detected in any focal point detecting region even at the time of a low luminance.

Because according to the third embodiment, no LED for the supplemental light source is provided in the camera main body, the size of the camera main body 21 is reduced.

Therefore, according to the third embodiment, there is such an effect that the focal point can be detected in any focal point detecting region even at the time of a low luminance while suppressing the size of the supplemental light source.

According to the third embodiment, if the external attachment stroboscope 22 having the LED 29 not corresponding to the multi-point automatic focal point detection is mounted, the stroboscope light source 28 of the external attachment stroboscope 22 is controlled to be used as the supplemental light source by the CPU 51a. This embodiment is not restricted to such control, however even if the external attachment stroboscope 22 having the LED 29 not corresponding to the multi-point automatic focal point detection is mounted, if the focal point is detected in the focal point detecting region SKa in the center of the screen, it is permissible that the LED 29 of the external attachment stroboscope 22 is controlled to be always used as the supplemental light source by the CPU 51a.

Figure 24:
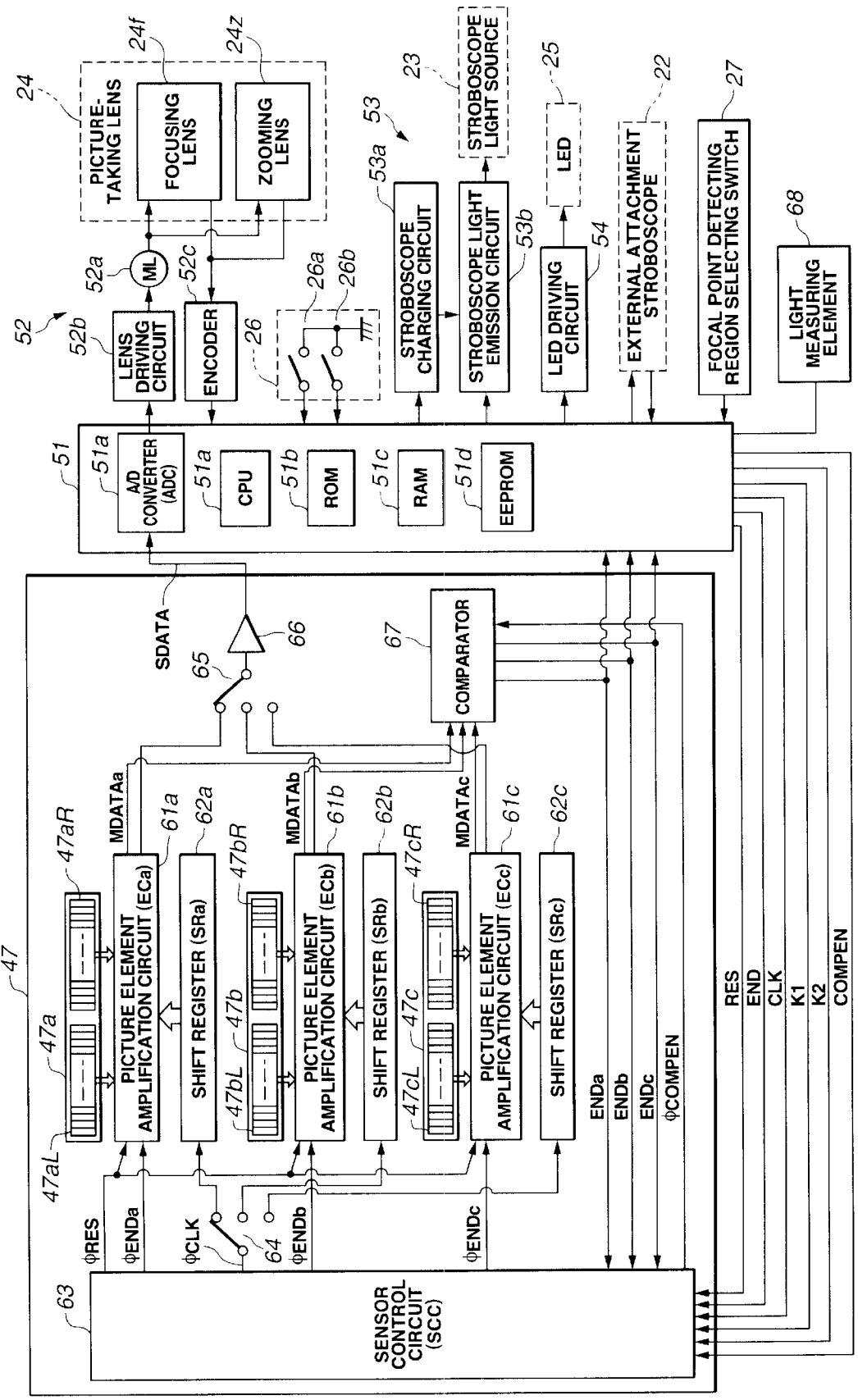
FIG. 24 is a block diagram showing a structure of electric control system in the modification of the camera of the third embodiment.

When detecting an irradiation range of the supplemental light source, it is permissible to determine an range which a light emission effect of the supplemental light can reach by comparing the light distribution characteristic of the supplemental light source with a focal distance of the photographing lens. That is, if the camera further has a zooming lens 24z as the photographing lens 24 and an encoder (EL) 52c corresponding to a position of the zooming lens 24z as shown in FIG. 24, information about the focal distance of the photographing lens 24a is obtained according to an output of the aforementioned encoder 52c and that information is compared with the light distribution characteristic of the supplemental light source in the above described step S102.

In the initial condition, it is permissible to control so that the LED supplemental light source is selected as the supplemental light source.

Figure 17:
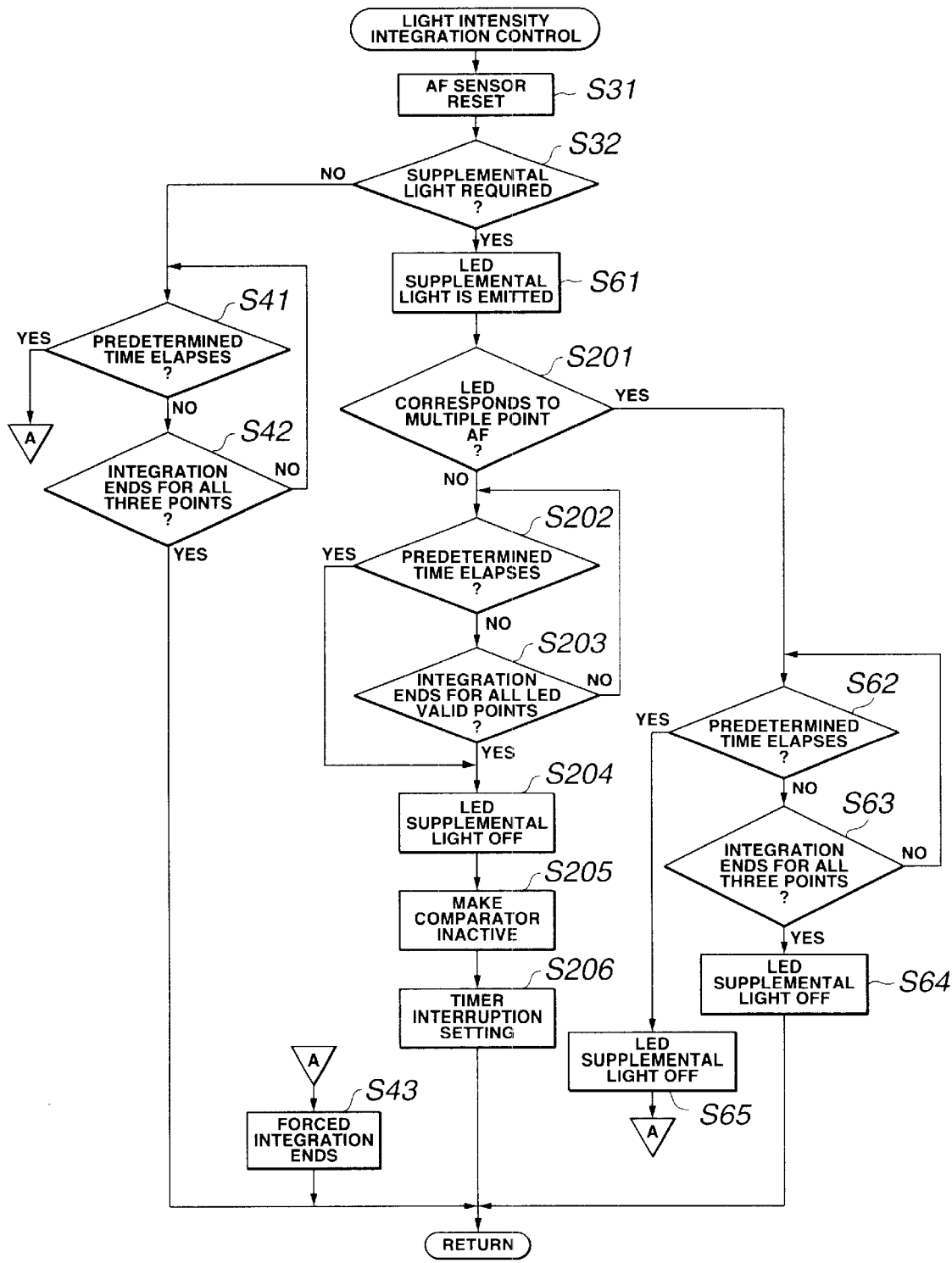
FIG. 17 is a flow chart showing an operation flow of light intensity integration control in the camera of a fourth embodiment of the present invention.
Figure 18:
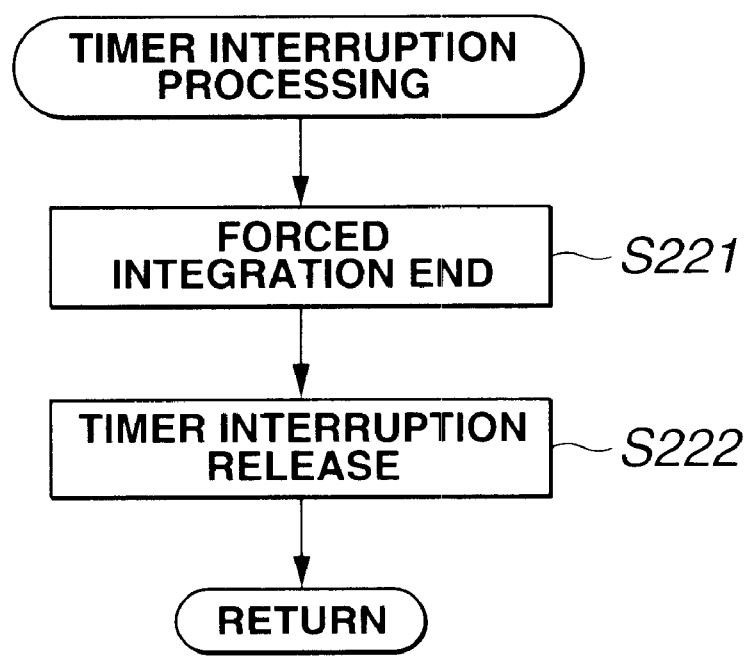
FIG. 18 is a flow chart showing an operation flow of timer interruption processing in the camera of the fourth embodiment.
Figure 19:
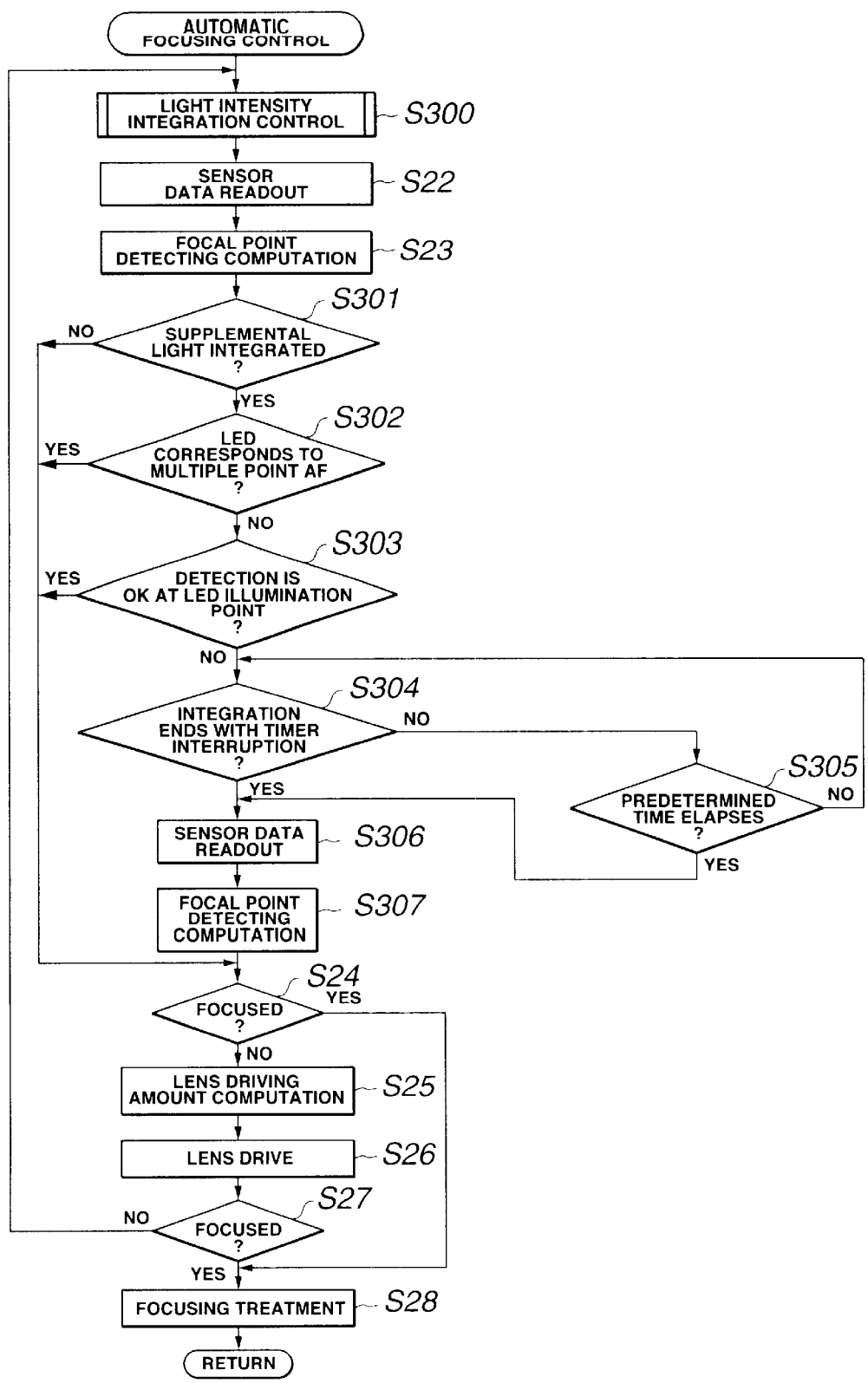
FIG. 19 is a flow chart showing an operation flow of automatic focusing control in the camera of the fourth embodiment.
Figure 20:
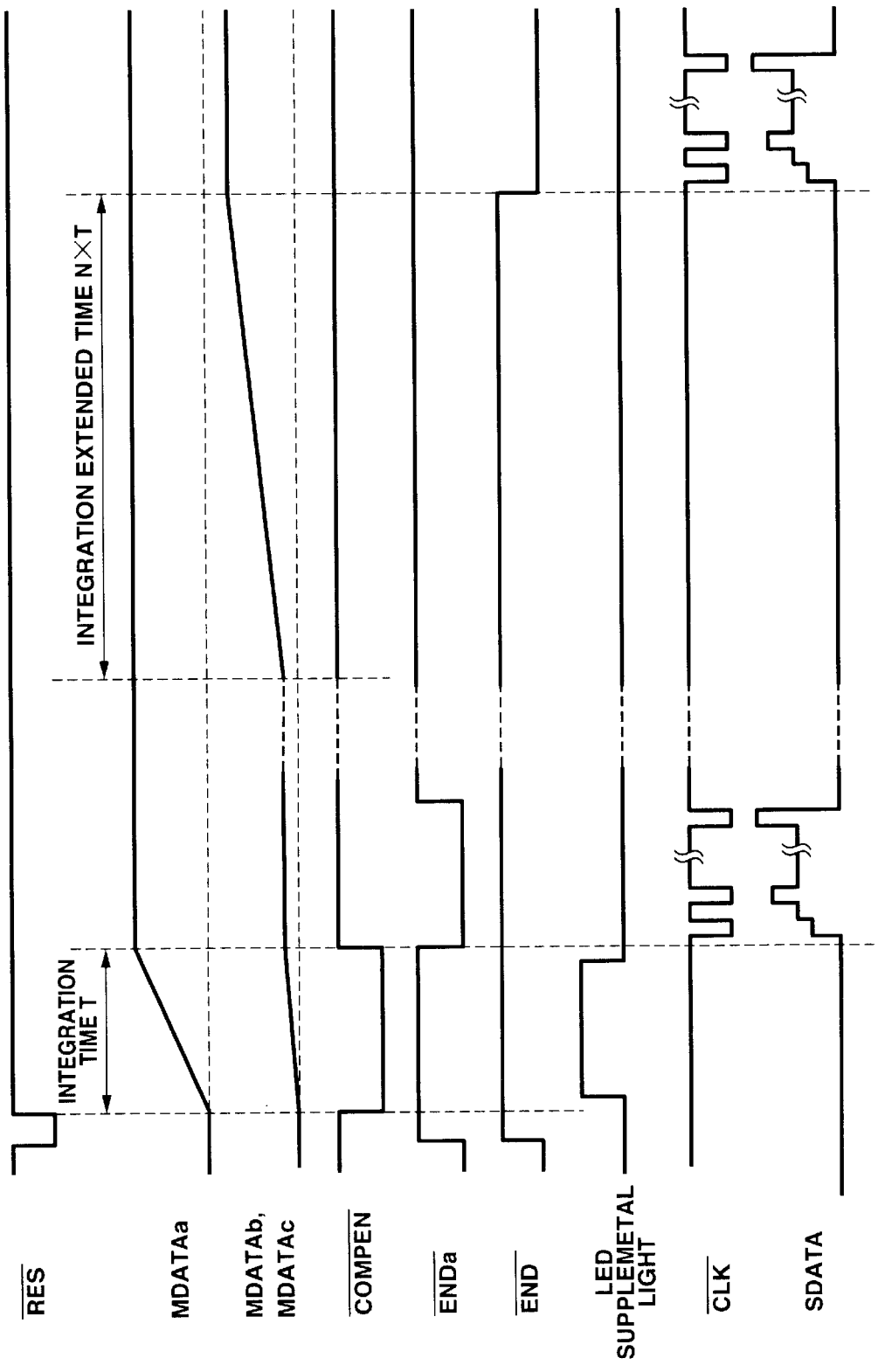
FIG. 20 is a timing chart showing an operation timing of major signals relating to light intensity integration in the camera of the fourth embodiment.

Next, a fourth embodiment of the present invention will be described. FIGS. 17–20 concern the fourth embodiment of the present invention. FIG. 17 is a flow chart showing an operation flow of light intensity integration control, FIG. 18 is a flow chart showing an operation flow of timer interruption processing, FIG. 19 is a flow chart showing an operation flow of automatic focusing control and FIG. 20 is a timing chart showing an operation timing of major signals relating to light intensity integration. In the fourth embodiment, like reference numerals are attached to components constructed in the same manner as and control steps having the same function as the first embodiment and a description thereof is omitted.

Although a structure of the multiple-point automatic focusing camera of the fourth embodiment is substantially the same as the first embodiment, the fourth embodiment is different from the first embodiment in that the stroboscope light sources 23, 28 are not used as the supplemental light source.

Next, an operation of the fourth embodiment will be described. In this embodiment, a description about an operation common to the first embodiment is omitted.

In light intensity integration control of this embodiment as shown in FIG. 17, first of all, AF sensor reset processing is carried out in step S31 like the first embodiment and processing proceeds to next step S32.

In next step S32, whether or not the supplemental light is necessary is determined like the first embodiment. If it is determined that the supplemental light is necessary, controls indicated in steps S41, S42, S43 are carried out like the first embodiment, and after that, light intensity integration control is terminated. If it is determined that the supplemental light is not necessary, processing proceeds to next step S61.

In subsequent step S61, light emission by the LED supplemental light source is started like the first embodiment and then, processing proceeds to next step S201.

In step S201, an irradiation range of the LED supplemental light source is detected and then, whether or not the LED supplemental light source corresponds to multi-point automatic focal point detection is determined. If the LED supplemental light source corresponds to the multi-point automatic focal point detection, processings in steps S62, S63, S64, S65, S43 are carried out like the first embodiment and then, the light intensity integration control is terminated. Further, if the LED supplemental light source does not correspond to the multi-point automatic focal point detection, processing proceeds to next step S202.

In next step S202, whether or not predetermined time passes is determined like step S62. If the predetermined time does not pass, processing proceeds to next step S203. If the predetermined time passes, processing is skipped to step S204.

In step S203, whether or not light intensity integration in a focal point detecting region in which the LED supplemental light source is effective is completely terminated is determined. If the light intensity integration is not terminated, processing is returned to step S202. If light intensity integration is terminated, processing proceeds to next step S204. Meanwhile, the focal point detecting region in which the LED supplemental light is effective refers to the focal point detecting region SKa in the center of the screen excluding, for example, the focal point detecting regions SKb, SKc in the periphery of the screen.

Instep S204, light emission of the LED supplemental light source is stopped like steps S64, S65 and then, processing proceeds to next step S205.

In subsequent step S205, the comparator 67 (see FIG. 5) is made inactive by COMPEN signal and then processing proceeds to next step S206. If the comparator 67 is made inactive, integration termination determination by the comparator 67 to the focal point detecting region excluding a focal point detecting region in which the LED supplemental light source is effective is stopped. If integration termination is determined, waiting condition for forced integration termination by the CPU 51a is produced.

In subsequent step S206, timer interruption setting is carried out so that the light intensity integration control is terminated. In this timer setting, a predetermined time is set up in a timer interruption circuit (not shown) incorporated, for example, in the CPU 51a so that the timer interruption processing is carried out if this predetermined time passes. As the predetermined time to be set up in the timer interruption circuit, for example, a time N times (N: natural number) integration time T already executed, for example, three times is set up.

Then, if this predetermined time passes, as described later, forced integration termination processing is carried out by timer interruption processing. That is, in step S206, the light intensity integration time is extended by a predetermined time, for example, N×T. Meanwhile, although the scope of the present invention is kept even if the extension of the integration time may be carried out by so controlling that the predetermined time passes by means of, for example, the CPU 51a, preferably, by using the timer interruption as described above, the CPU 51a is capable of executing other processing, for example, processing for reading out sensor data and focal point detection computation processing, so that the processing is executed rapid by the CPU 51a.

As shown in FIG. 18, in the timer interruption processing, in step S221, first of all, the forced integration termination processing is carried out like step S43 and next, in step S222, the timer interruption setting is released. Consequently, processing is returned to control step being executed when the timer interruption occurs.

In the automatic focusing control of this embodiment as shown in FIG. 19, in step S300 first, light intensity integration control (see FIG. 17) is carried out. Like the first embodiment, sensor data is read out in step S22 and the focal point detection computation is carried out in step S23 like the first embodiment. Preferably, step S22 is started with the timer interruption setting of step S206 effective. If timer interruption is generated halfway of processing of step S22 or after step S22, the aforementioned timer interruption processing (see FIG. 18) is carried out.

In subsequent step S301, whether or not the supplemental light is used in light intensity integration control of step S300 is determined. If the supplemental light is not used, processing is skipped to step S24 and like the first embodiment, processings of steps S24, S25, S26, S27, S28 are carried out. If the supplemental light is used, processing proceeds to next step S302.

In subsequent step S302, whether or not the LED supplemental light source corresponds to the multi-point automatic focal point detection is determined. If the LED supplemental light source corresponds to the multi-point automatic focal point detection, processing is skipped to step S24. If the LED supplemental light source does not correspond to, processing proceeds to next step S303.

In subsequent step S303, whether or not the focal point can be detected is determined by focal point detection computation by well known correlation computation in a focal point detecting region irradiated by the LED supplemental light source. If the focal point can be detected, processing is skipped to step S24. If the focal point cannot be detected, processing proceeds to next step S304. For example, if the focal point detecting region contained in the irradiation range of the LED supplemental light source is only the focal point detecting region SKa in the center of the screen, whether or not the focal point can be detected in the focal point detecting region SKa in the center of the screen is determined. Because the focal point detection in the focal point detecting regions SKb, SKc in the periphery not irradiated with the supplemental light is neglected, the processing of the CPU 51a is accelerated.

In subsequent step S304, whether or not the forced integration termination processing has been carried out in step S221 for timer interruption processing (FIG. 18) is determined. If this forced integration termination processing is not executed, processing is transferred to step S305. If the forced integration termination processing is executed, processing proceeds to next step S306.

In step S305, whether or not a predetermined time passes in a timer of the timer interruption circuit is determined. If the predetermined time does not pass, processing is returned to step S304. If the predetermined time passes, processing proceeds to step S306. Meanwhile, the predetermined time in step S305 is set longer than a predetermined time in the above described steps S41 and S62.

On the other hand, in step S306, sensor data is read out again like step S22 and in subsequent step S307, focal point detecting computation is carried out using the read out sensor data like step S23. Then, processing proceeds to step S24. In steps S306, S307, light intensity signal read-out and focal point detecting computation are carried out to a focal point detecting region not irradiated with the supplemental light. The light intensity signal read out in step S306 at this time is a signal subjected to light intensity integration by extending the integration time as shown in FIG. 20.

As described above, the focal point is detected in the foal point detecting region not irradiated with the supplemental light by extending the light intensity integration time (charge accumulation time).

As described above, according to this embodiment, the supplemental light can be projected to the focal point detecting region SKa in the center of the screen by the supplemental light source composed of, for example, the LEDs 25, 29 and consequently, the focal point can be detected in the focal point detecting region SKa in the center of the screen even at the time of a low luminance.

Because the light intensity integration is carried out by extending the integration time (charge accumulation time) to the focal point detecting regions SKb, SKc not irradiated with the supplemental light, the focal point can be detected in the focal point detecting regions SKb, SKc in the periphery even at the time of a low luminance.

Because the supplemental light source composed of, for example, the LEDs 25, 29 does not have to irradiate the focal point detecting regions SKb, SKc in the periphery, the size of the supplemental light source composed of, for example, the LEDs 25, 29 is suppressed so that production cost is also suppressed.

Therefore, according to the fourth embodiment, there is such an effect that the focal point can be detected in any focal point detecting region even when at the time of a low luminance while suppressing the size of the supplemental light source.

Further, according to the fourth embodiment, because the stroboscope light source is not used as the supplemental light source, as compared to a structure using the stroboscope light source as the supplemental light source, a circuit which controls the stroboscope light source as the supplemental light source is eliminated, so that reduction of the size and production cost is achieved.

According to the fourth embodiment, the processing speed is considered important and in step S303 (see FIG. 19), in case where the focal point can be detected in the focal point detecting region SKa in the center of the screen irradiated with the supplemental light, the focal point detection in the focal point detecting regions SKb, SKc in the periphery of the screen not irradiated with the supplemental light is neglected. However, this embodiment is not restricted to such a control, and even if the focal point can be detected in the focal point detecting region SKa in the center of the screen, the focal point detecting computation may be carried out to the focal point detecting regions SKb, SKc in the periphery of the screen.

Further, when the irradiation range of the supplemental light is detected, it is permissible to determine a range which the supplemental light is capable of reaching by comparing the light distributing characteristic of the supplemental light with the focal distance of the photographing lens.

Next, a fifth embodiment of the present invention will be described.

Figure 21:
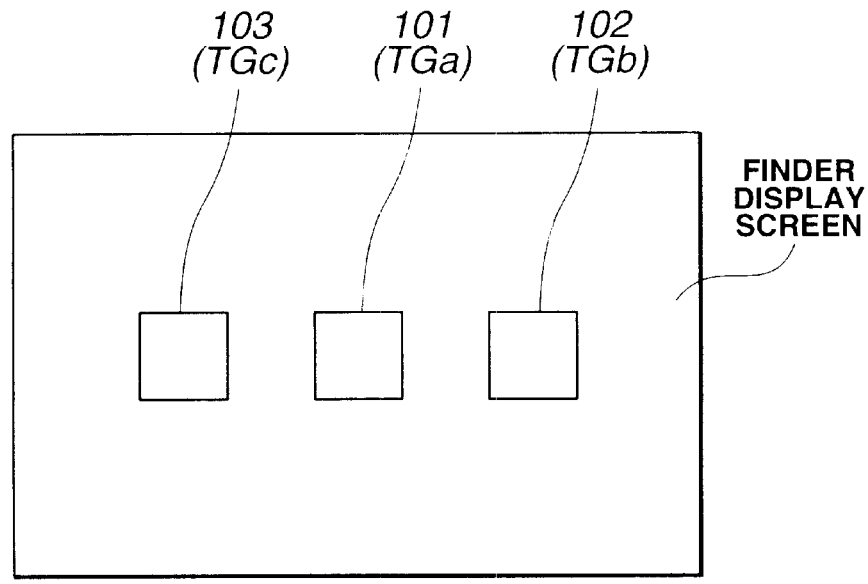
FIG. 21 is an explanatory diagram showing a structure of finder display screen in the camera of a fifth embodiment of the present invention.

FIG. 21 is an explanatory diagram showing a configuration of the finder display screen according to the fifth embodiment. Meanwhile, like reference numerals are attached to components constructed in the same manner as the first embodiment and a description thereof is omitted.

The multiple-point automatic focusing camera of the fifth embodiment has a different structure of the finder display screen from the first embodiment. As shown in FIG. 21, in the finder display screen of this embodiment, focal point detectable region display portions 101, 102, 103 indicating whether or not respective focal point detecting regions SKa, SKb, SKc are irradiated with the LED supplemental light are provided at positions corresponding to target displays TGa, TGb, TGc of the finder display screen from the first embodiment (see FIG. 7). The focal point detectable region display portions 101, 102, 103 are superimposed on the finder display screen by a well known superimpose technology and lit when the LED supplemental light is projected to the corresponding focal point detecting regions SKa, SKb, SKc.

The display control on these focal point detectable region display portions 101, 102, 103, for example, may be carried out in step S9 for main control (see FIG. 8) or just after step 28 for automatic focal point control (see FIG. 9) or just before step S51 for light intensity integration control (see FIG. 10).

Next, an operation of the fifth embodiment will be described. A description of an operation common to the first embodiment is omitted.

According to the fifth embodiment, if the LED supplemental light is projected to the focal point detecting region SKa in the center of the screen while no LED supplemental light is projected to the focal point detecting regions SKb, SKc in the periphery, the focal point detectable region display portion 101 is lit and the other focal point detectable region display portions 102, 103 go out. As a result, a photographing person is informed of which focal point detecting region is irradiated with the LED supplemental light so that the focal point can be detected.

According to the fifth embodiment, the same effect as the first embodiment is obtained. According to the fifth embodiment, the photographing person can be informed of which focal point detecting region is irradiated with the LED supplemental light and which focal point detecting region is not irradiated with the LED supplemental light.

Further, because the photographing person can know which focal point detecting region is irradiated with the LED supplemental light, he can be informed of whether or not the LED supplemental light corresponds to the multi-point automatic focal point detection.

Further, because the photographing person can know which focal point detecting region is irradiated with the LED supplemental light, by adjusting a photographing direction such that a main object is located in the focal point detectable region irradiated with the LED supplemental light, automatic focusing is enabled at a position of the main object.

Meanwhile, technical philosophy of the fifth embodiment is not only applicable for the first embodiment but also the second to fourth embodiments. If the technical philosophy of the fifth embodiment is applied to the fourth embodiment, the photographing person can know that there is a possibility that the focal point could not be detected in the periphery of the screen and he can take pictures again.

Figure 22:
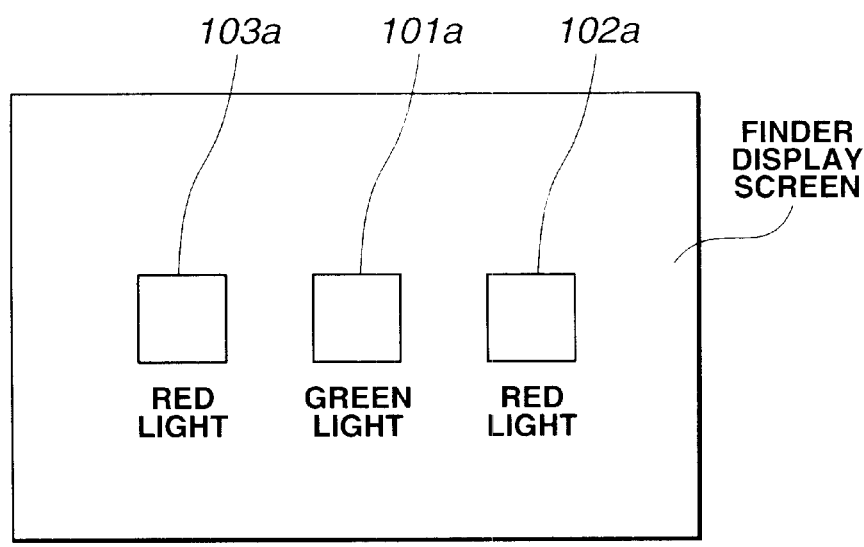
FIG. 22 is an explanatory diagram showing a structure of finder display screen in a modification of the camera of the fifth embodiment.

Although according to the fifth embodiment, whether or not the supplemental light is irradiated is indicated by ON or OFF of the focal point detectable region display portions 101, 102, 103, this embodiment is not restricted to such a structure, however it is permissible to provide with the focal point detectable region display portions 101a, 102a, 103a which notifies of whether or not the supplemental light is irradiated with color, for example, as shown in a modification of FIG. 22.

In the modification shown in FIG. 22, the focal point detectable region display portion 101a is indicated with green corresponding to the focal point detecting region SKa in the center of the screen irradiated with the supplemental light. Then, the focal point detectable region display portions 102a, 103a are indicated with red corresponding to the focal point detecting regions SKb, SKc in the periphery of the screen not irradiated with the supplemental light. However, it is needless to say that the combination of colors is not restricted to this example.

Although according to the fifth embodiment, the focal point detectable region display portions 101, 102, 103 are disposed at positions corresponding to the target indications TGa, TGb, TGc, this embodiment is not restricted to such a structure, however it is permissible to provide a display portion 111 composed of, for example, liquid crystal display (LCD) below the finder display screen like the modification sown in FIG. 23.

Figure 23:
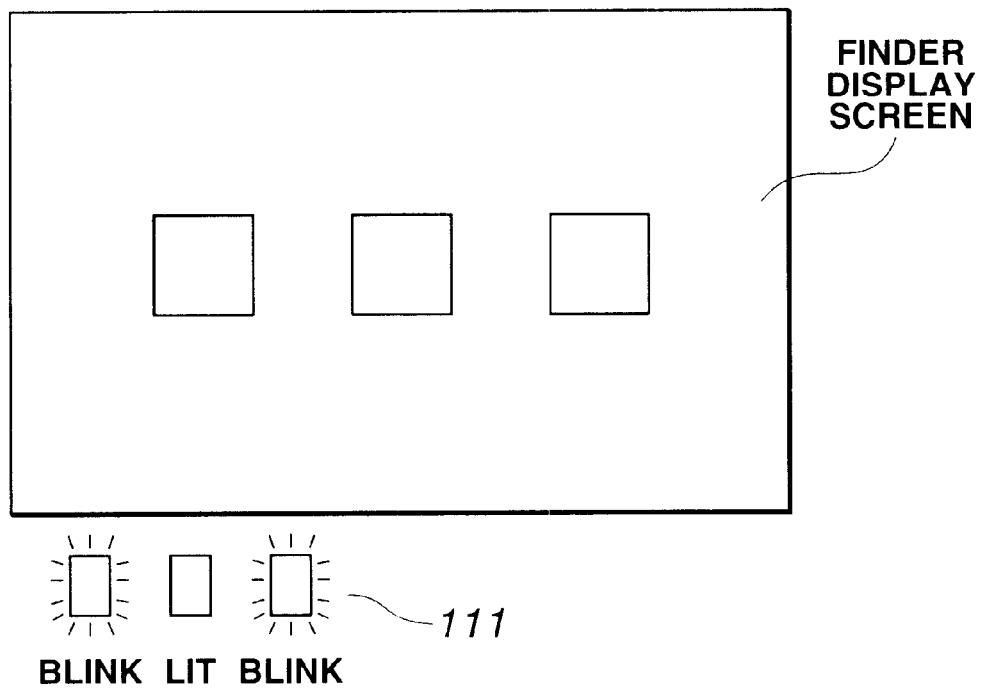
FIG. 23 is an explanatory diagram showing a structure of finder display screen in another modification of the camera of the fifth embodiment.

In the modification shown in FIG. 23, the display portion 111 corresponding to the focal point detecting region SKa in the center of the screen irradiated with the supplemental light is lit and the display portion 111 corresponding to the focal point detecting regions SKb, SKc not irradiated with the supplemental light blink.

Further, the focal point detectable region display portion does not have to be always indicated through the finder, however may be disposed in the LCD display portion (not shown) provided at other place than the finder of the camera, for example.

The focal point detectable region display portion not only notifies a photographing person of a difference between the focal point detecting region irradiated with the supplemental light and the focal point detecting region not irradiated with the supplemental light with a difference between light ON and OFF or a difference between lighting and blinking, but also may notify with other indication which the photographing person can recognize.

Meanwhile, the present invention is not restricted to the above described embodiments, however may be modified in various ways within a scope not departing from a spirit of the invention.

As described above, according to the present invention, there is such an effect that the focal point can be detected in any focal point detecting region even at the time of a low luminance while suppressing the size of the supplemental light source.

In this invention, it is apparent that working modes different in a wide range can be formed on this basis of this invention without departing from the spirit and scope of the invention. This invention is not restricted by any specific embodiment except being limited by the appended claims.

What is claimed is:

1. A camera capable of detecting focal points in a plurality of focal point detecting regions, comprising:
    a first light source for emitting light to an object at the time of exposure; and
    a controller for operating said first light source as a supplemental light source depending on in which focal point detecting region of said plurality of focal point detecting regions said focal point is detected.

2. A camera according to claim 1 further comprising an input device for selecting at least a focal point detecting region of said plurality of focal point detecting regions, wherein said controller controls an operation of said first light source based on a selection result of said input device.

3. A camera according to claim 1, wherein said first light source is a stroboscope light source.

4. A camera according to claim 1 further comprising a second light source which does not emit light at the time of exposure, wherein said controller operates any one of said first light source and said second light source as a supplemental light source for detecting the focal point.

5. A camera according to claim 4, wherein said controller, when the focal point is detected in the focal point detecting region located in the periphery of a shot screen of said plurality of focal point detecting regions, operates said first light source as a supplemental light source, and when the focal point is detected in the focal point detecting region located in the center of the shot screen of said plurality of focal point detecting regions, operates said second light source as the supplemental light source.

6. A camera according to claim 4 further comprising a selecting circuit for selecting at least a focal point detecting region of said plurality of focal point detecting regions, wherein said controller controls said first light source or said second light source based on information selected by said selecting circuit.

7. A camera according to claim 4 further comprising a memory which stores a light irradiation range of said second light source, wherein said controller determines whether or not said second light source is capable of irradiating over said plurality of focal point detecting regions based on a content stored in said memory and if there is any region incapable of being irradiated with light from said second light source, operates said first light source as a supplemental light source for detecting the focal point.

8. A camera according to claim 7 further comprising a detector for detecting a focal distance of a photographing lens, wherein said controller determines whether or not said second light source is capable of irradiating over said plurality of focal point detecting regions based on a content stored in said memory and an output from said detector and if there is any region incapable of being irradiated with light from said second light source, operates said first light source as a supplemental light source for detecting the focal point.

9. A camera according to claim 4, wherein said second light source is provided on an externally attached casing separate from a camera main body.

10. A camera according to claim 4, wherein said second light source is a light source capable of irradiating part of said plurality of focal point detecting regions with light, said camera further comprising a display device which notifies an operator of said focal point detecting region capable of being irradiated with light or said focal point detecting region incapable of being irradiated with light.

11. A camera according to claim 4, wherein said second light source is a light source for irradiating over a range smaller than said first light source.

12. A camera according to claim 4, wherein said second light source is a light emission diode.

13. A camera according to claim 4, wherein said second light source is a lamp.

14. A multiple-point automatic focusing camera according to claim 4, wherein said second light source is a light emission body which emits no flash light.

15. A multiple-point automatic focusing camera capable of detecting focal points in plurality of focal point detecting regions, comprising:
  light emission means used as a light source when said focal point is detected;
  control means for controlling said light emission means;
  light detecting means which receives light fluxes in said plurality of focal point detecting regions so as to obtain a light intensity signal corresponding to light intensity;
  integrating means for integrating light intensity signals obtained by said light detecting means;
  integration control means for controlling an integration time by said integrating means; and
  irradiation region determining means for determining a focal point detecting region irradiated with light from said light emission means of said plurality of focal point detecting regions,
  wherein said integration control means, if it is determined that there is a focal point detecting region not irradiated with light from said light emission means in said plurality of focal point detecting regions by said irradiation region determining means, extends an integration time of said integration means corresponding to a focal point detecting region not irradiated with light from said light emission means.

16. A multiple-point automatic focusing camera according to claim 15 further comprising a display means for notifying an operator of said focal point detecting region capable of being irradiated by said light emission means or said focal point detecting region incapable of being irradiated.

17. A multiple-point automatic focusing camera according to claim 15 further comprising a means for carrying out focal point detecting computation in each focal point detecting region corresponding to an output of said integrating means, wherein said focal point detecting computation means, if the focal point can be detected in the focal point detecting region irradiated with light from said light emission means of said plurality of focal point detecting regions, inhibits focal point detecting computation in a focal point detecting region not irradiated with light from said light emission means.

18. A multiple-point automatic focusing camera which obtains a shot screen through a photographing lens and detects the focal points in plurality of focal point detecting regions in said shot screen, comprising:
  multiple kinds of supplemental light emission means used as a supplemental light source at the time of focal point detection while any one thereof having the smallest irradiation range is selected initially;
  supplemental light control means for driving said supplemental light emission means;
  supplemental light effect determining means for determining a supplemental light emission effect and range based on light distribution characteristic of said supplemental light emission means; and
  selection means for, if the focal point is detected in said focal point detecting region determined to have an insufficient effect of the supplemental light by said supplemental light determining means, changes the kind of said supplemental light emission means.

19. A multiple-point automatic focusing camera according to claim 18 further comprising focal distance detecting means for detecting a focal distance of said photographing lens wherein said supplemental light effect determining means determines a range which the emission effect of the supplemental light reaches by comparing a light distribution characteristic of said supplemental light emission means with a focal distance of said photographing lens detected by said focal point detecting means.

20. A multiple-point automatic focusing camera according to claim 18, wherein of multiple kinds of said supplemental light emission means, supplemental light emission means selected initially is a bulb or light emission diode and at least one of supplemental light emission means different from said supplemental light emission means selected initially is a stroboscope unit.

21. A multiple-point automatic focusing camera which obtains a shot screen through a photographing lens and detect the focal points in a plurality of focal point detecting regions in said shot screen, comprising:
  supplemental light emission means used as a supplemental light source at the time of focal point detection;
  supplemental light control means for driving said supplemental light emission means;
  light detecting means for obtaining an electric signal by integrating light intensity level of said focal point detecting region on the basis of time;
  supplemental light effect determining means for determining a range which the supplemental light emission effect reaches based on light distribution characteristic of said supplemental light emission means; and
  changing means for, if the focal point is detected in said focal point detecting region determined to have an insufficient effect of the supplemental light by said supplemental light determining means, extending an integration time by the light detecting means longer than normally.

22. A multiple-point automatic focusing camera according to claim 21, further comprising focal distance detecting means for detecting the focal distance of the photographing lens, wherein said supplemental light effect determining means compares the light distribution characteristic of said supplemental light emission means and the focal distance of the photographing lens detected by said focal distance detecting means with each other to determine the range of the influence of light emission effect of the supplemental light.

23. A camera comprising:
- a sensor for detecting information dependent of a distance up to an object about multiple points in a shot screen;
- multiple light sources of various kinds for illuminating said object when said sensor is actuated;
- a circuit for selecting whether said information is detected about any or all objects of said points; and
- a controller for changing over said light source based on an output of said selecting circuit.

24. A camera according to claim 23, wherein said light source includes a first light source for illuminating a wide range of the shot screen and a second light source for illuminating a narrower range than said first light source and said controller selects one of said first light source and said second light source based on an output of said selecting circuit and makes the selected light source emit light.

25. A camera according to claim 24, wherein said first light source is a stroboscope unit.

26. A camera according to claim 24, wherein said selecting circuit selects a first mode for detecting said information for an object in a wide range of said shot screen and a second mode for detecting said information for an object in a narrower range than said first mode, and said controller, when said first mode is selected by said selecting circuit, selects said first light source and when said second mode is selected, selects said second light source.

27. A camera according to claim 26, wherein said first mode is a mode for detecting said information for objects at multiple points in the shot screen and said second mode is a mode for detecting said information for an object at the central point in the shot screen.

28. A camera according to claim 23, wherein said controller contains a control circuit for controlling an operation of said sensor and controls an operation of said sensor and light source based on an output of said selecting circuit.

29. A camera according to claim 28, wherein said control circuit controls a length of charge accumulation time of said sensor.

30. A camera according to claim 23, wherein said selecting circuit is a switch operable by a photographing person.

31. A camera according to claim 23, wherein said selecting circuit is CPU.

* * * * *